United States Patent
Savage

(10) Patent No.: US 12,001,547 B2
(45) Date of Patent: Jun. 4, 2024

(54) METHOD, SYSTEM AND APPARATUS FOR DETECTING MALICIOUS MODIFICATIONS TO SEMICONDUCTOR DEVICES

(71) Applicant: Rocksavage Technology, Inc., Campbell, CA (US)

(72) Inventor: Thomas Warren Savage, Campbell, CA (US)

(73) Assignee: Rocksavage Technology, Inc., Campbell, CA (US)

( * ) Notice: Subject to any disclaimer, the term of this patent is extended or adjusted under 35 U.S.C. 154(b) by 285 days.

(21) Appl. No.: 17/529,640

(22) Filed: Nov. 18, 2021

(65) Prior Publication Data
US 2023/0153422 A1  May 18, 2023

(51) Int. Cl.
| | |
|---|---|
| *G06F 21/55* | (2013.01) |
| *G06F 11/10* | (2006.01) |
| *G06F 30/333* | (2020.01) |
| G06F 7/58 | (2006.01) |
| G06F 111/04 | (2020.01) |

(52) U.S. Cl.
CPC .......... *G06F 21/55* (2013.01); *G06F 11/1004* (2013.01); *G06F 30/333* (2020.01); *G06F 7/584* (2013.01); *G06F 2111/04* (2020.01); *G06F 2221/034* (2013.01)

(58) Field of Classification Search
None
See application file for complete search history.

(56) References Cited

U.S. PATENT DOCUMENTS

2003/0172268 A1* 9/2003 Walmsley ............. H04L 9/3271
 713/168
2005/0229062 A1* 10/2005 Volkerink ........ G01R 31/31921
 714/738

OTHER PUBLICATIONS

McClusky, Edward J., "Verification Testing—A Pseudoexhaustive Test Technique", IEEE Trans. Computers, vol. 33, No. 6, pp. 541-546 (Jun. 1984).
Frohwerk, Robert A., "Signature Analysis: A New Digital Field Service Method", Hewlett-Packard Journal (May 1977).

* cited by examiner

*Primary Examiner* — Brandon Hoffman
(74) *Attorney, Agent, or Firm* — Artie Pennington Law Offices, PLLC; Artie Pennington; Hannah Ward

(57) ABSTRACT

A computer-implemented method, and system, for detecting modification of a semiconductor device includes generating and applying an exhaustive first set of patterns to a netlist golden model of a golden device. The exhaustive first set of patterns is developed by a pseudorandom number generator. Applying the patterns to stimulate the device produces a first response serial bit stream in relation to logical composition of the golden model. A signature analyzer compresses the total output to provide a first cyclic redundancy code or answer. The same exhaustive set of patterns can be provided to stimulate the model of an unknown device. The unknown device is shown to be identical to the golden device if its answer matches that of the golden device and modified if its answer does not match that of the golden device.

19 Claims, 19 Drawing Sheets

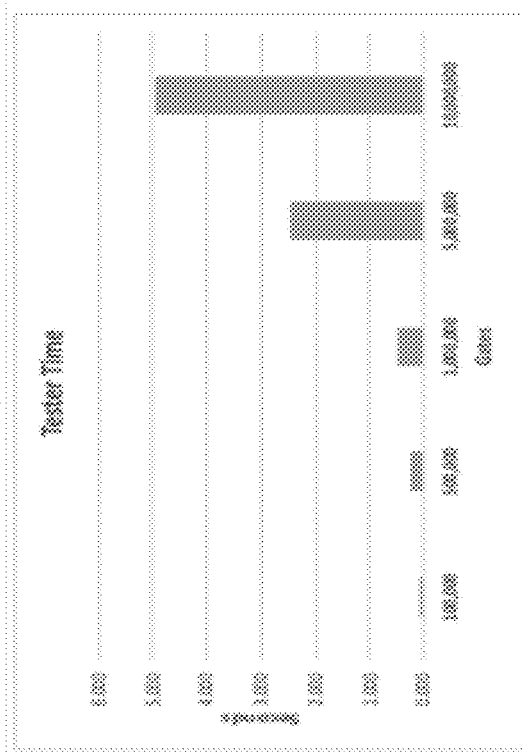
FIG. 17a
FIG. 17b
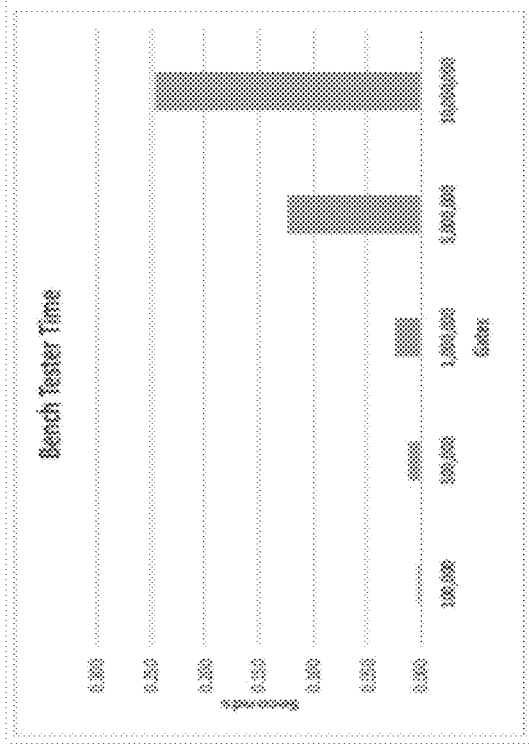
FIG. 17c
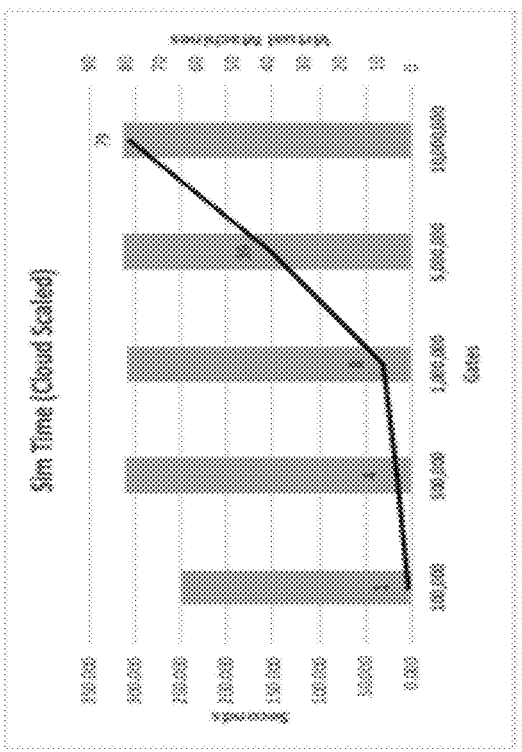
FIG. 17d

METHOD, SYSTEM AND APPARATUS FOR DETECTING MALICIOUS MODIFICATIONS TO SEMICONDUCTOR DEVICES

CROSS-REFERENCE TO RELATED APPLICATIONS

This application at the date of filing is not related to any other application.

FIELD OF THE INVENTION

The present disclosure relates to design and manufacturing of semiconductor devices and electronic devices (collectively "devices"). More particularly, the disclosure relates to securing the design and manufacturing of devices by detecting malicious modifications.

BACKGROUND OF THE INVENTION

In general, in the descriptions that follow, the first occurrence of each special term of art that should be familiar to those skilled in the art of integrated circuits ("ICs") and systems will be italicized. In addition, when a term that may be new or that may be used in a context that may be new, that term will be set forth in bold and at least one appropriate definition for that term will be provided. In addition, throughout this description, the terms assert and negate may be used when referring to the rendering of a signal, signal flag, status bit, or similar apparatus into its logically true or logically false state, respectively, and the term toggle to indicate the logical inversion of a signal from one logical state to the other. Alternatively, the mutually exclusive Boolean states may be referred to as logic_0 and logic_1. Of course, as is well known, consistent system operation can be obtained by reversing the logic sense of all such signals, such that signals described herein as logically true become logically false and vice versa. Furthermore, it is of no relevance in such systems which specific voltage levels are selected to represent each of the logic states.

In this disclosure, a device shall mean a digital semiconductor device or packaged semiconductor including one or more IC's. Hereinafter, reference to a facility shall mean a circuit or an associated set of circuits adapted to perform a particular function regardless of the physical layout of an embodiment thereof. Thus, the electronic elements comprising a given facility may be instantiated in the form of a hard macro adapted to be placed as a physically contiguous module, or in the form of a soft macro the elements of which may be distributed in any appropriate way that meets speed path requirements. In general, electronic systems comprise many different types of facilities, each adapted to perform specific functions in accordance with the intended capabilities of each system. Depending on the intended system application, the several facilities comprising the hardware platform may be integrated onto a single IC or distributed across multiple ICs. Depending on cost and other known considerations, the electronic components, including the facility-instantiating IC(s), may be embodied in one or more single- or multi-chip packages. However, unless expressly stated to the contrary, the form of instantiation of any facility shall be considered as being purely a matter of design choice.

BRIEF SUMMARY OF THE INVENTION

The above-mentioned shortcomings, disadvantages and problems are addressed herein, as will be understood by those skilled in the art upon reading and studying the following specification. This summary is provided to introduce a selection of concepts in simplified form that are further described below in more detail in the Detailed Description. This summary is not intended to identify key or essential features of the claimed subject matter.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

According to this disclosure, in an embodiment, a method may use regular, canonical structures to create an apparatus to exhaustively verify an unknown device against a known-correct golden reference device. One of ordinary skill will understand that a golden device is a known-correct device, and a golden model of a golden device is a known-correct model of the known-correct device. As used herein "known-correct" refers to function and structure of the device.

An exhaustive set of automatically generated patterns may be applied to stimulate a golden device to produce a response based on the logical composition of the golden device. The response may be compressed by a signature analyzer to produce a cyclic redundancy check code (CRC) that represents a golden answer associated with the applied patterns, as applied to the golden device or golden model, such as a netlist golden model. The same patterns may be then applied to an unknown device, to produce a response of the unknown device which may be similarly compressed by a signature analyzer to produce a cyclic redundancy check code (CRC) that represents its own answer, i.e. the unknown device answer responsive to application of the same patterns to the unknown device. The compressed answers for the unknown device and golden device may be compared. If the two answers match, the unknown device may be considered an authentic and exact copy of the golden device.

The methods and systems of this disclosure may be applicable to all devices, but may be especially effective on large devices consisting primarily of digital circuits. The following conditions may be requirements of the device in order to render a method effective: 1) all flip-flops may be scannable, 2) any latches be made scannable or put into a transparent mode during operation of the apparatus, 3) non-digital logic and memories must be appropriately "fenced" so as to not introduce indeterminate responses to any applied pattern, 4) logic cone size be less than or equal to the length of the PRNG's used for pattern generation, and 5) the digital portion of the device may be capable of being reset into a consistent state prior to the application of patterns. Each of the preceding design constraints may be mandatory for performing the methods, and in systems, in embodiments as disclosed herein. Furthermore, it may be recommended, but not mandatory, that scan chain lengths be a length that may be not a modulo of the bit-length of the PRNG implementation (e.g. 16).

The semiconductor industry today has evolved dramatically over the last 50 years into a highly disaggregated and efficient supply chain. It may be common for a device design to pass through a dozen hands before the final device may be delivered back to its owner for sale. Each of these stages represent a potential attack surface for a malicious actor to introduce a hardware trojan ("HT") without the knowledge of the device owner. Compounding the issue may be that modern device designs may be extremely large, comprised of tens of billions of transistors. A HT may be as small as a few dozen transistors making detection, a proverbial "needle in a haystack."

Described herein is an exemplary hardware trojan ("HT") attack scenario representative of the risk to the device owner and user of the device from such an attack and how that attack may be executed. In such an attack scenario, a commercial device company may produce numerous designs each year and come to rely on outsourcing certain tasks to a third-party company for mundane tasks such as preparing the final design package for the foundry to manufacture the device. The third-party possesses the complete design and employs a number of temporary workers to perform the work. One worker may be secretly paid by a foreign government to insert a HT into the design for the purpose of creating a payload where secret keys may be exposed at a certain time that may be coincident with the HT trigger. Only the worker and the foreign government may be aware of this insertion. The device may be manufactured as normal, but the attacker understands how to trigger the HT and expose the secret keys which may be used by the device owner to unlock special features for an extra fee. The attacker may then sell those keys on the black market at a greatly reduced price and undercut the device owner's expected return on those special features.

Apparatus, systems, and methods of varying scope are described herein. These aspects are indicative of various non-limiting ways in which the disclosed subject matter may be utilized, all of which are intended to be within the scope of the disclosed subject matter. In addition to the aspects and advantages described in this summary, further aspects, features, and advantages will become apparent by reference to the associated drawings, detailed description, and claims.

BRIEF DESCRIPTION OF THE DRAWINGS

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

FIGS. 17a, 17b, 17c and 17d are bar charts showing relative speed for four testing methods for detecting modification of a semiconductor device in embodiments.

Figure 1:
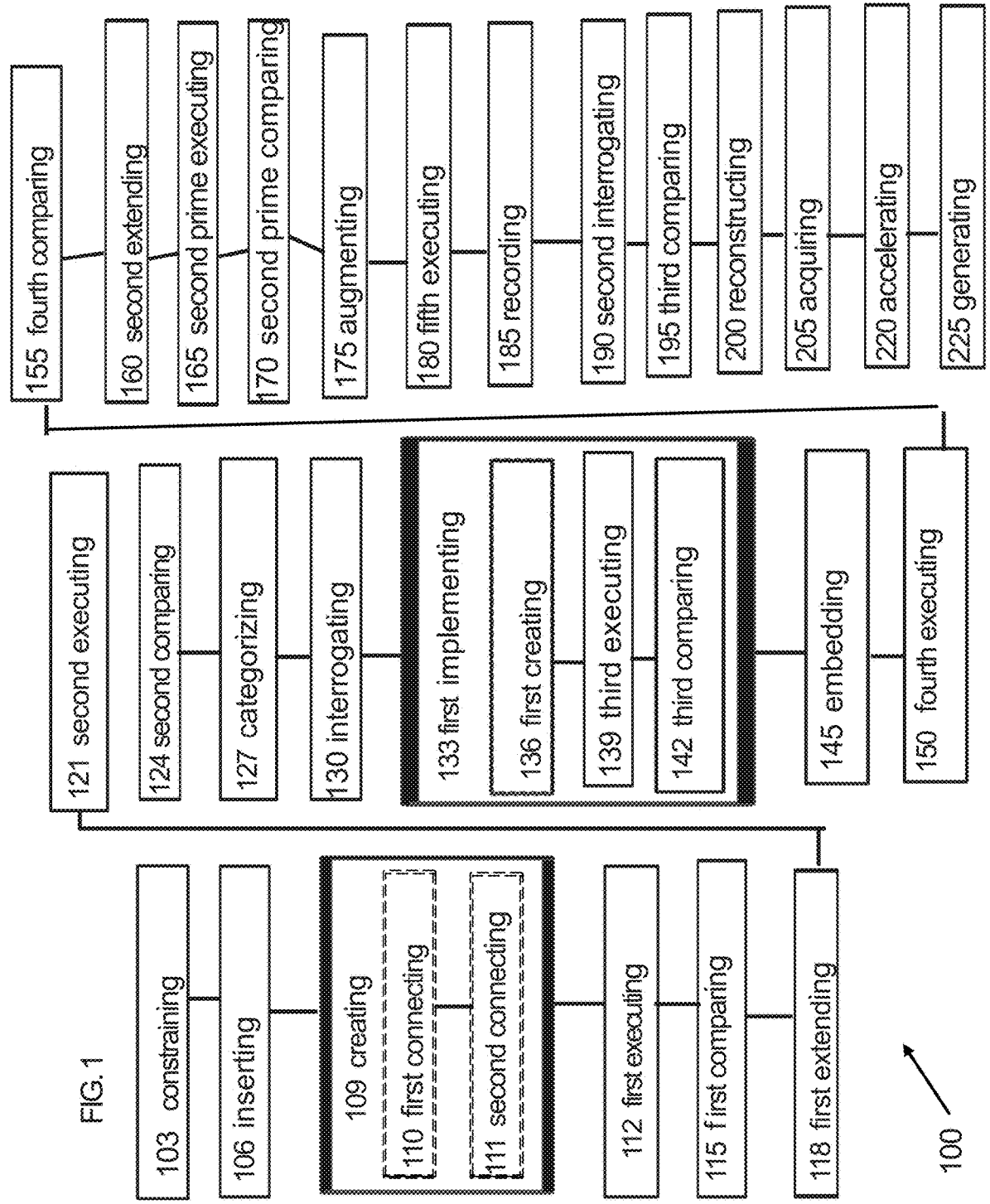
FIG. 1 is a simplified flow diagram of a computer-implemented detecting method capable of detecting a modification in a semiconductor device, in an exemplary embodiment.

The novel features believed characteristic of the disclosed subject matter will be set forth in any claims that are filed later. The disclosed subject matter itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF ILLUSTRATIVE EMBODIMENTS

In this detailed description, reference is made to the accompanying drawings which form a part hereof, and in which is shown by way of illustration specific embodiments which may be practiced. Reference now should be made to the drawings, in which the same reference numbers are used throughout the different figures to designate the same components. These embodiments are described in sufficient detail to enable those skilled in the art to practice the embodiments and disclosure. It is to be understood that other embodiments may be utilized, and that logical, mechanical, electrical, and other changes may be made without departing from the scope of the embodiments and disclosure. In view of the foregoing, the following detailed description is not to be taken as limiting the scope of the embodiments or disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

It will be appreciated that for simplicity and clarity of illustration, where considered appropriate, reference numerals may be repeated among the figures to indicate corresponding or analogous elements. In addition, numerous specific details are set forth in order to provide a thorough understanding of the implementations described herein. However, it will be understood by those of ordinary skill in the art that the implementations described herein may be practiced without these specific details. In other instances, well-known methods, procedures and components have not been described in detail so as not to obscure the implementations described herein. Also, the description is not to be considered as limiting the scope of the implementations described herein.

The detailed description set forth herein in connection with the appended drawings is intended as a description of exemplary embodiments in which the presently disclosed apparatus and system can be practiced. The term "exemplary" used throughout this description means "serving as an example, instance, or illustration," and should not necessarily be construed as preferred or advantageous over other embodiments.

The following illustrates the principles of the invention. It will be appreciated that those skilled in the art will be able to devise various arrangements which, although not explicitly described or shown herein, embody the principles of the invention and may be included in the spirit and scope.

Illustrated in FIG. 1 is a method 100 (or "detecting method 100") for detecting modification of a semiconductor device in relation to a known golden device, in an embodiment. It will be understood that reference herein to a "device" may mean a known golden semiconductor device (or "golden device"), an untrusted semiconductor device (or "untrusted device"), or both. Thus, unless inconsistent with context of the reference, or unless otherwise specified, reference herein to "device" means a semiconductor device, which may be a known golden device, an untrusted device, or both, for comparing an untrusted device to a known golden device by performing detecting method 100. Comparison of the untrusted device to the known golden device thus may be performed by computer-implemented detecting method 100. Performing such detecting method 100 may determine either of the following: (i) verifying identity of the known golden device and untrusted device, or (ii) detecting modification of the untrusted device in relation to the known golden device. It will be understood that, in an embodiment, modification of the untrusted device in relation to the known golden device may be characterized as unauthorized, malicious modification, such as a modification by introducing a hardware trojan ("HT") into the untrusted device. In an embodiment, modification of the untrusted device in relation to the known golden device may be characterized as malicious modification, such as a modification by introducing a hardware trojan ("HT") into the untrusted device with intent to modify the device, which may occur without disclosure to the owner of the device, disclosure to the end user of the device, or both. Unless context requires otherwise, as used herein "malicious modification" shall be understood to include unauthorized modification of a device. In an embodiment, modification of the untrusted device in relation to the known golden device may be characterized as unauthorized modification, such as a modification by introducing a hardware trojan ("HT") into the untrusted device without authorization of the owner or end user of the device, or both. Unless context requires otherwise, as used herein "malicious modification of an untrusted device" shall include possible unauthorized introduction of a modification into a device and thus, without limitation, may include unauthorized introduction of a modification into a preceding known golden device to produce a corruption of the preceding known golden device, and thus shall be referenced as an untrusted device. It will also be understood that a device which possibly includes an unauthorized, malicious modification introduced without authorization of the owner of the device, end user of the device, or both, may be regarded as "untrusted" unless verified by method 100 as disclosed herein.

One of ordinary skill will understand that, as used herein, "malicious modification(s)" may include unauthorized modification(s) and unauthorized malicious modification(s). One of ordinary skill may distinctly separate or distinguish "malicious modification" from other modification(s) and defect(s). As used herein, "malicious modification(s)" may be distinctly separated from other modification(s) and defect(s), as follows: "Modification(s)" are any change(s) to the design. Modifications, as such, may be change(s) to correct a defect or to change the function(s) of a circuit for any particular reason. "Defect(s)" are failure(s) in the manufacturing of a device, and not an intended modification. Defect(s) may be expected or unexpected results of manufacturing processes. A defective device is not performing according to its design due to problems in the manufacturing process or materials used in the manufacturing process. Defects are a natural artifact of mass production of any system. Various quality control techniques are developed and implemented to ensure or render it highly likely that defective units are detected and not put into operation. "Malicious modification(s)" are specific kinds of modifications, distinguished from defect(s) and other modification(s), that may be detected by methods and systems as herein disclosed.

Malicious modification(s) have specific characteristics that, considered together, distinguish malicious modification(s) from defect(s) and other modification(s), as follows:

Malicious modification(s) are performed by a $3^{rd}$-party without authorization of the IC owner (i.e. unauthorized) and/or may be performed without being disclosed to the IC end user;

There is a malicious intent for making the modification(s);

The modification(s) are introduced secretly by the $3^{rd}$-party without knowledge of the IC owner, the IC end user, or both;

The modification(s) are made in a way that it is concealed from the IC owner, IC end user, or both;

Malicious modification(s) are not defects per the definition hereinabove;

Malicious modification(s) may be structured to permit the IC to operate correctly per the IC owner's specification.

But such modification(s) may introduce functionality that is known only to the 3$^{rd}$-party making the modification(s) and/or only activatable by the 3$^{rd}$-party; and Malicious modification(s) are intended to avoid detection and/or remain unidentified when the IC is tested to identify defects by automated test pattern generation (ATPG) testing.

TABLE 1

Nature of modifications and defects

| Type | Intentional | Hidden | Source of difference |
|---|---|---|---|
| Modification | Yes | No | IC owner |
| Defect | No | Yes | IC manufacturer |
| Malicious Modification | Yes | Yes | 3$^{rd}$-party |

Automated test pattern generation (ATPG) verification methods have been deemed sufficient for detecting defects in IC's. However, application of ATPG verification techniques rely on the assumption that the IC design is known and has not been secretly, intentionally modified without being disclosed in relation to the original IC design. For this reason, ATPG verification techniques for detecting defects in IC's are not sufficient for detecting malicious modifications, which are secret modifications, intended to avoid detection or identification.

TABLE 2

Efficacy of verification techniques against modifications and defects

| Type | ATPG/Functional Test Vectors | Exhaustive Verification | Invention |
|---|---|---|---|
| Detection of Modification | Partial* | Yes | Yes |
| Detection of Defect | Partial* | Yes | Yes |
| Detection of Malicious Modification | No | Yes | Yes |
| Automatic test bench generation | No | No | Yes |
| Identification of the Modification or Defect | No | No | Yes |
| Acceleration of detection with cloud computing | No | No | Yes |

As used herein, "Partial Detection" means that the ATPG or functional test vectors are rarely 100% effective even for identifying defects where it has been assumed that the subject IC design is known, trusted, and not the subject of unauthorized modification. Semiconductor companies typically produce test coverage requirements based on internal quality standards, with 90% or higher being normal, only to identify defects and based upon assumption that the subject IC design is known, trusted, and not the subject of unauthorized modification. Attackers may take advantage of these gaps and assumptions, and construct and introduce malicious modifications hidden in these areas. Additionally, since ATPG test vectors are developed on an unmodified device, they are limited to only detecting defects in the unmodified design. A maliciously modified design opens up a new, unmonitored testing space that the ATPG or functional test vectors are not capable of testing for defects.

Referring to FIG. 1, method 100 may include constraining 103 the design of the device to a constrained configuration suitable for verification testing. Constraining 103 thus may include preparing a constrained design of the device for verification testing. As explained in the preceding, the device may include the golden device, untrusted device, or both. In constraining 103, the design of the device may be constrained by being configured to comply with all of a set of essential verification testing design constraints that are necessary for detection testing to proceed to a state of completion that enables the following: (i) identifying modification of the untrusted device in relation to the golden device, or (ii) verifying identity of the untrusted device and golden device. Constraining 103 may include imposing a set of essential verification testing design constraints in a constrained test version design of the device. In an embodiment, the essential verification testing design constraints may include all of the following constraints or requirements of the test version design of the device: (i) all flip-flops are made scannable, (ii) all latches are made scannable or put into a transparent mode during operation of the device, (iii) all non-digital logic and memories are appropriately "fenced" so as to not introduce indeterminate responses to any applied pattern, (iv) all logic cone sizes are made less than or equal to the length of the PRNG's used for pattern generation, and (v) the digital portion of the device is made capable of being reset into a consistent state prior to application of patterns. In an embodiment, in addition to the preceding constraints (i) through (v), an additional, optional verification testing design constraint may be imposed, which is that: (vi) scan chain lengths are made a length, or lengths, that are not a modulo of the bit-length of the PRNG implementation (e.g. 16). In an alternative embodiment (not shown), the constrained design of the device may be configured to comply with some, but fewer than all, of the aforementioned verification testing design constraints.

As shown in FIG. 1, method 100 may include inserting 106 to provide a constrained netlist design of the device, suitable for verification testing. Inserting 106 may include preparing the constrained netlist design by scan insertion to provide a constrained netlist embodying the verification testing design constraints of the device. The constrained netlist, provided by scan insertion, may be configured or determined to be suitable for verification testing. In first prime preparing, the verification testing constrained netlist of the device may be configured to meet and comply with all of the verification testing design constraints (i) through (v). The scan insertion may be computer-implemented using a verification testing constrained netlist received by a computing system configured to perform manufacturing test of the verification testing constrained design of the device. The computing system may perform scan insertion into the final netlist in which all flip-flops may be organized into n-number scan chains of maximal m-length, where n and m may be selected in relation to characteristics of the verification testing constrained design of the device. It is noted that, in first prime preparing 108, scan chains do not need to be the same length, and m reflects the length of the longest scan chain.

Figure 13:
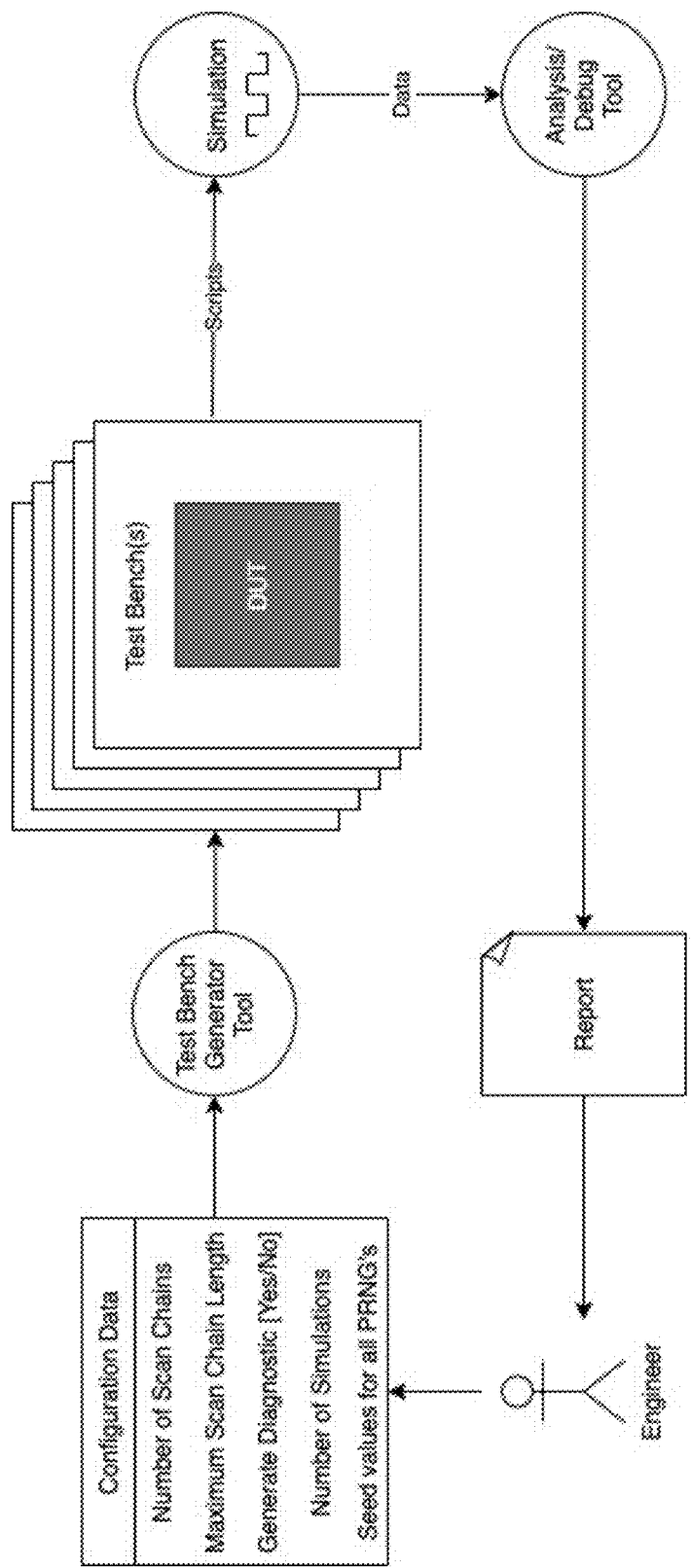
FIG. 13 is a simplified flow diagram showing automated generation of test benches and automatic generation of tools for analyzing failing tools in an embodiment.

Referring to FIG. 1, method 100 may include creating 109 a test bench system. Creating 109 may further include first connecting 110 a PRNG to each of the n scan chain inputs, may be then created where a PRNG may be connected to each of the n scan chain inputs, i.e. "scan_in[0], scan_in[1], . . . , scan_in[n]" and second connecting 111 the scan outputs to a SA, as shown in further detail in FIG. 14. In first connecting 110, primary inputs may be connected to the parallel outputs of a serial shift register with its serial input connected to a PRNG. In second connecting, primary outputs may be connected to the parallel inputs of a serial shift register with its serial output connected to a SA. In an alternative implementation, all outputs may be combined into a single SA by XOR'ing the outputs together as shown in FIG. 13.

Referring to FIG. 1, method 100 may include first executing 112, by the test bench system, an exhaustive testing algorithm (or "exhaustive test algorithm") with the device. In an embodiment, first executing 112 may include executing the following exhaustive testing algorithm:

```
initialize PRNG's with seed values
initialize SA's to zero
reset the device under test ("DUT")
loop for 65536
    scan in new PRNG pattern for m clocks and
        simultaneously scan out result of previous
        pattern into SA
    execute one non-scan clock
end loop
``` to test the device. First executing 112 may be performed with the golden device and untrusted device.

Referring to FIG. 1, method 100 may include first comparing 115 first and second contents of the SA(s) from first executing 112 the exhaustive testing algorithm both with the known golden device to provide the first contents (i.e., the golden answer) of the SA(s), and also from first executing 112 the exhaustive testing algorithm with the untrusted device to provide the second contents of the SA(s). The actual output pattern provided from testing the untrusted device thus may be checked or compared to the expected output pattern provided from benchmark testing of the golden device by first executing 112 the exhaustive testing algorithm.

Referring to FIG. 1, method 100 may include first comparing 115 first and second contents of the SA(s) from first executing 112 the exhaustive testing algorithm both with the known golden device to provide first contents (i.e. the golden answer) of the SA(s), and also from second executing 121 the exhaustive testing algorithm with the untrusted device to provide the second contents of the SA(s). The actual output pattern provided from first executing 112 the exhaustive testing algorithm with the untrusted device thus may be checked or compared to the expected output pattern provided from benchmark first executing 112 the exhaustive testing algorithm with the golden device with the identical exhaustive testing algorithm.

In an embodiment, method 100 disclosed herein may be performed for testing physical devices produced by manufacturing, Those of ordinary skill will understand that devices may be manufactured according to the following basic flow: 1) the netlist may be converted into a format (such as GDSII or Oasis) that allows the device to be manufactured into silicon wafers that contains many copies of the design reduced to silicon; 2) the wafers may be sliced into individual dies; 3) the dies may be assembled into packages to create a device; and 4) the devices may be loaded into a tester for checking the correctness of the device operation and with failing devices being rejected. It will be understood that method 100 disclosed herein may be performed for such testing of physical devices produced by manufacturing, by performing a procedure including the following steps 118, 121 and 127.

Figure 18:
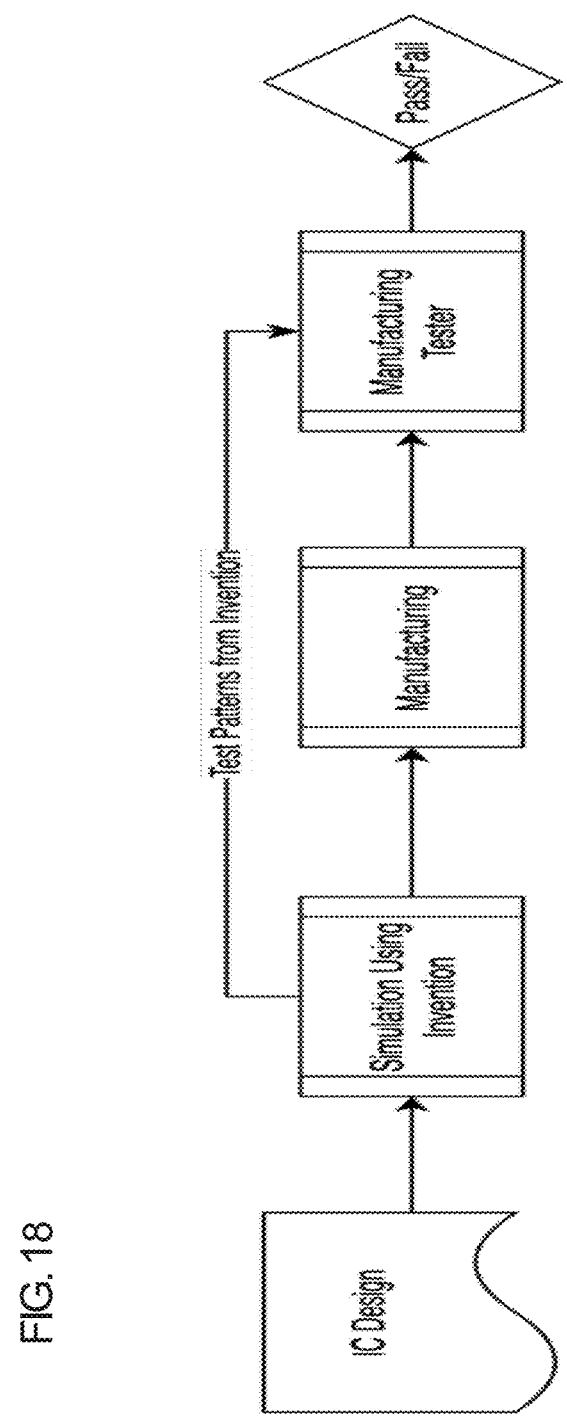
FIG. 18 is a simplified flow diagram showing a method for detecting modification of a manufactured semiconductor device by simulation, of extracted test vectors from exhaustive testing of a known golden design, on the manufactured device on a tester.

Referring to FIG. 1, method 100 may include first extending 118 configuration of the test bench system to include a test bench first extension capable of extended extraction of input patterns by testing the device. Such test bench first extension may be capable of extended monitoring of all device inputs and outputs during exhaustive testing of the device, to extract the full set of input patterns (input vectors) that may be applied to the device. As shown in FIG. 18, in an embodiment, such test bench first extension may monitor all primary inputs and outputs of the device and thus facilitate recording of same when performing an exhaustive test algorithm. As shown in detail in FIG. 16, the first extending 118 may include providing a correlated, extracted full set of output patterns (output vectors) in relation to the extracted full set of input patterns (input vectors) that may be applied to the device on the tester. First extending 118 may include monitoring all inputs and all outputs of the device while is it being tested, to produce a complete set of input and output test vectors for such exhaustive testing. Thereafter, the extracted set of input and output test vectors may be "played" on a conventional device tester. In this way, the device tester may apply the algorithmically generated patterns to untrusted manufactured devices. Such testing of manufactured devices by application of extracted input and output test patterns is otherwise not possible. This is due to the limitation that such testers are capable of playing test vectors, but incapable of generating test vectors. Shown in Table 3 is an example of such input and output test patterns "extracted" from simulation into files. The subject design-under-test (DUT) is a 64-bit multiplier with 64 inputs and 64 outputs, which the binary patterns represented by a hexadecimal number on each line.

TABLE 3

Exemplary generation of input and output test vectors

| Vector | Input | Output |
| --- | --- | --- |
| 1 | 937a26f54deb9bd7 | 9d4507cd90f825fe |
| 2 | e70cce189c303860 | d32873b33b50c40e |
| 3 | b3f767efcfde9fbc | 9239cd84a555c7fe |

In an embodiment, such first extending 118 may include extracting the inputs, extracting the outputs, and applying the input pattern to the manufactured DUT on a tester to check or determine the actual response of the DUT under the same extracted inputs, in comparison to the extracted output pattern. An IC design may be simulated with accompanying generation of test vectors. The generated test vectors can be provided to a tester which will "replay" the simulation patterns against the manufactured device. If the design has been modified during the manufacturing phase to produce a modified device, the tester will detect any such modification, in addition to detecting any defects. As shown in FIG. 18, such extracted test vectors may be provided to a tester to replay the simulation patterns against the physical, manufactured device to either detect modification, or verify identity, of the manufactured device in relation to a known golden design. It is notable that the size of such vector files is enormous. For example, where first extending 118 includes monitoring the inputs and outputs of the DUT while being tested, to produce a set of input and output test vectors, such monitoring run across the above, simple design produces more than 4 million test vectors, which in turn produces a vector file that is more than 570 MB in size.

Referring to FIG. 1, method 100 may include second executing 121 the test bench system with the test bench first extension to perform an exhaustive testing algorithm with the device. Second executing 121 may be performed with the golden device and untrusted device. Such second executing 121 the test bench system with the test bench first extension may provide extended testing of the device to extract a full set of input patterns (input vectors) that may be applied to the device on a tester. As shown in detail in FIG. 16, such second executing 121 the test bench system with the test bench first extension may provide a correlating set of output patterns (output vectors) in relation to the extracted full set of input patterns (input vectors) applied to the device. In an embodiment, second executing 121 may include executing an exhaustive testing algorithm.

Referring to FIG. 1, method 100 may include second comparing 124 first and second contents of the SA(s) from second executing 121 the test bench system with the test bench first extension to perform an exhaustive testing algorithm, both with the known golden device to provide extended first contents (i.e. the golden answer) of the SA(s), and also with the untrusted device, to provide the extended second contents of the SA(s). The actual output pattern provided from second executing 121 the test bench system with the test bench first extension to perform an exhaustive testing algorithm with the untrusted device, thus may be checked or compared to the expected output pattern provided from benchmark second executing 121 of the test bench system with the test bench first extension to perform an exhaustive testing algorithm with the golden device.

Referring to FIG. 1, method 100 may include categorizing 127 the untrusted device in relation to the golden device, based upon the first comparing 115, second comparing 124, or both. Such categorizing 127 may include categorizing the untrusted device in relation to the golden device, based upon the first comparing 115 actual output of the untrusted device and the expected output pattern provided from the golden device by first executing 121 the test bench system to perform an exhaustive testing algorithm with the golden device and untrusted device. Such categorizing 127 may also include categorizing the untrusted device in relation to the golden device, based upon the second comparing 124 actual output of the untrusted device and the expected output pattern provided from the golden device by second executing 121 the test bench system with the test bench first extension to perform an exhaustive testing algorithm with the golden device and untrusted device. In an embodiment, such categorizing 127 may include categorizing the untrusted device in relation to the golden device, based upon both first comparing 115 and second comparing 121. Categorizing 127 may include passing untrusted devices or failing untrusted devices, in relation to the first comparing 115 or second comparing 121. In an embodiment, such categorizing 127 may include passing untrusted devices or failing untrusted devices, in relation to both the first comparing 115 and second comparing 121. Untrusted devices categorized as passing may be placed into a Pass bin, and untrusted devices categorized as failing may be placed into a Fail bin.

Referring to FIG. 1, method 100 may include interrogating 130 untrusted devices categorized as failing (or "failing devices") to isolate a particular failure. Referring to FIG. 1, method 100 may include first implementing 133 real-time hardware bench testing of a manufactured device. First implementing 133 may include first creating 136 a lab test bench implemented in hardware. First creating 136 a lab test bench implemented in hardware may include implementing test bench inputs and outputs, including PRNG's and SA's, in hardware, identical to the simulation test bench inputs and outputs. In an embodiment, such hardware may include Field Programmable Gate Arrays (FPGA's) configured as the PRNG's and SA's. See also FIG. 5 and FIG. 19. In an embodiment, first implementing 133 may include third executing 139 in real-time the lab test bench implemented in hardware with the manufactured device. For clarity, in contrast, first executing 112 and second executing 121 a model, such as a netlist, of the device may be performed in simulation time. Referring to FIG. 1, such third executing 139 in real-time the lab test bench with the manufactured device placed therein may include executing testing identical to first executing 112, second executing 121, or both. Referring to FIG. 1, such first implementing 133 real-time hardware bench testing of a manufactured device, may include third comparing 142 SA results of third executing 139 the same exhaustive testing algorithm with the manufactured untrusted device in relation to the manufactured golden device, the same exhaustive testing algorithm with the golden device model, or both.

Figure 7:
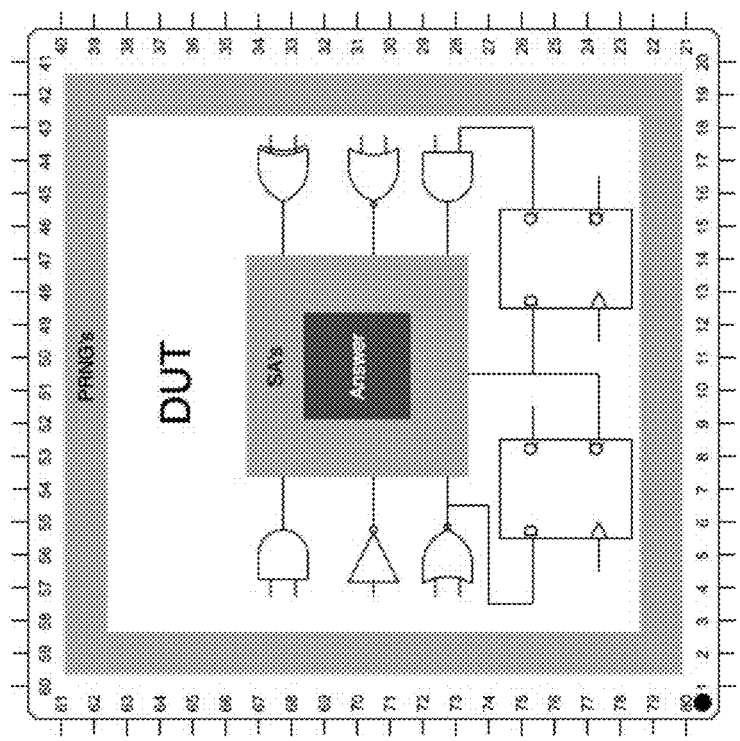
FIG. 7 is a simplified schematic diagram of test bench system embedded inside a device in an embodiment capable of testing manufactured devices without an external test bench system.

Referring to FIG. 1, method 100 may include embedding 145 an embedded test bench system into a device to perform in situ testing of the device. In embedding 145, such an embedded test bench system may be structured to perform all functions of a non-embedded test bench system provided in the first creating 136. In an embodiment, an embedded test bench system may be identical in structure and functions to a non-embedded test bench system as provided in first creating 136. As shown in FIG. 7, the embedded test bench system may be adapted with a set of essential verification testing design constraints in a constrained test version design of the device, as described elsewhere herein in relation to constraining 103. Referring to FIG. 1, method 100 may include fourth executing 150 device self-testing by executing an embedded test bench system. Fourth executing 150 device self-testing may be executed by placing the device in self-test mode to execute embedded test structures of the embedded test bench system on the device. Method 100 may include fourth comparing 155 SA results of fourth executing 150 device self-testing by executing the same exhaustive testing algorithm with the manufactured untrusted device having the embedded test bench system in self-test mode in relation to fourth executing 150 device self-testing by executing the same exhaustive testing algorithm with the manufactured golden device having the embedded test bench system in self-test mode; first executing 112 the same exhaustive testing algorithm with the golden device model, or both.

Figure 19:
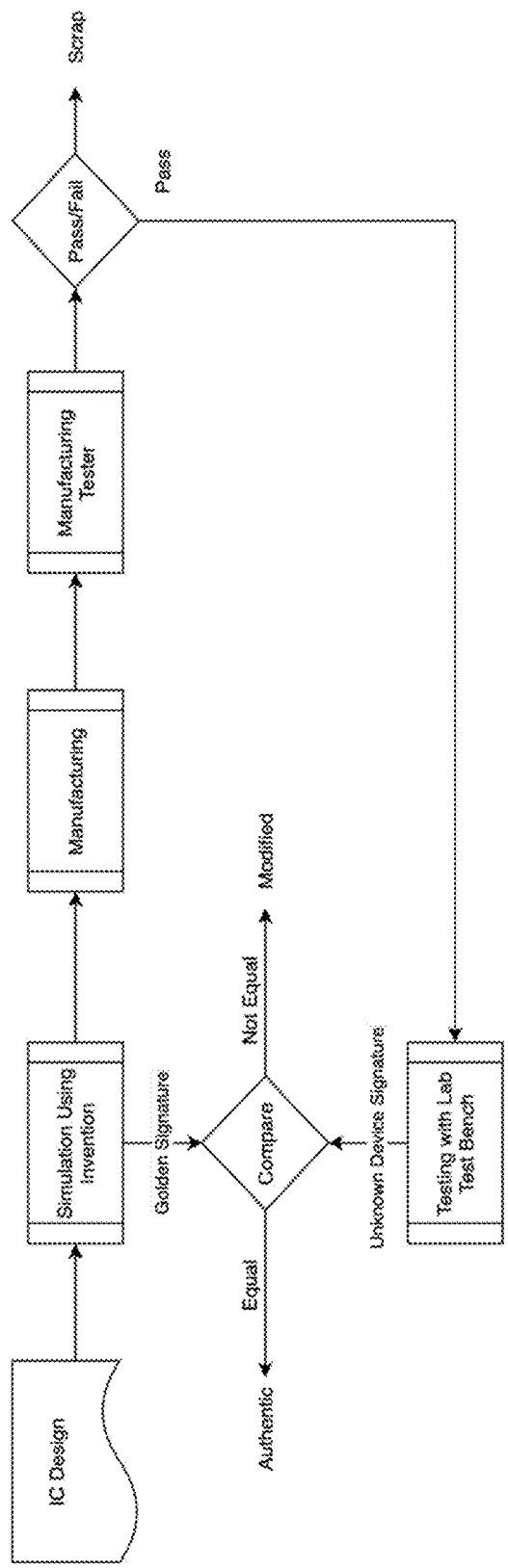
FIG. 19 is a simplified flow diagram similar to FIG. 18, showing a method for detecting modification of a manufactured semiconductor device in an assembled system, by application of extracted test vectors from exhaustive testing of a hardware implementation of a known golden design, to the manufactured device on a laboratory test bench.

Referring to FIG. 1, method 100 may include second extending 160 a test bench system having a test bench second extension to provide second extended diagnostic testing functions in relation to a device. The subject of second extending 160 a test bench system with test bench second extension, may be either a non-embedded system or embedded system. Referring to FIG. 1, method 100 may include second prime executing 165 the test bench system with test bench second extension to perform second extended diagnostic testing functions in relation to the device. Such a test bench second extension may include a plurality of bit SA's connected to all device primary inputs and outputs to monitor and facilitate recording the same during execution of an exhaustive test algorithm. As shown in FIG. 19, such a test bench second extension may include a hardware implementation (such as an FPGA) of a golden device, suitable for testing with a lab test bench, for comparison to an untrusted semiconductor device embodied in a physical article of manufacture. Such second prime executing 165 to perform second extended diagnostic testing functions may provide second extended diagnostic testing output. In an embodiment, the second extended diagnostic testing output may be sufficient to enable pinpoint locating of a device failure identified by testing, wherein such failure is associated with an unauthorized, malicious modification. Method 100 may include second prime comparing 170 bit SA results of second prime executing 165 the same exhaustive testing algorithm with the test bench system having the test bench second extension, for the manufactured untrusted device in relation to the manufactured golden device. In the alternative, second prime comparing 170 bit SA results of second prime executing 165 the same exhaustive testing algorithm with the test bench system having the test bench second extension, may be performed to compare a manufactured untrusted device in relation to the golden device model. In the further alternative, second prime comparing 170 bit SA results of second prime executing 165 the same exhaustive testing algorithm with the test bench system having the test bench second extension, may be performed to compare an untrusted device model in relation to the golden device model.

In an embodiment, the second prime comparing 170 bit SA results for all device outputs of a manufactured untrusted device may further include enabling and reaching a pass or fail determination of the manufactured untrusted device. The second prime comparing 170 bit SA results for all device outputs of a manufactured untrusted device may pinpoint a location of a failure identified by testing and comparing bit SA and SA results for an untrusted device in relation to a golden device, wherein such failure is associated with an unauthorized, malicious modification.

Figure 10:
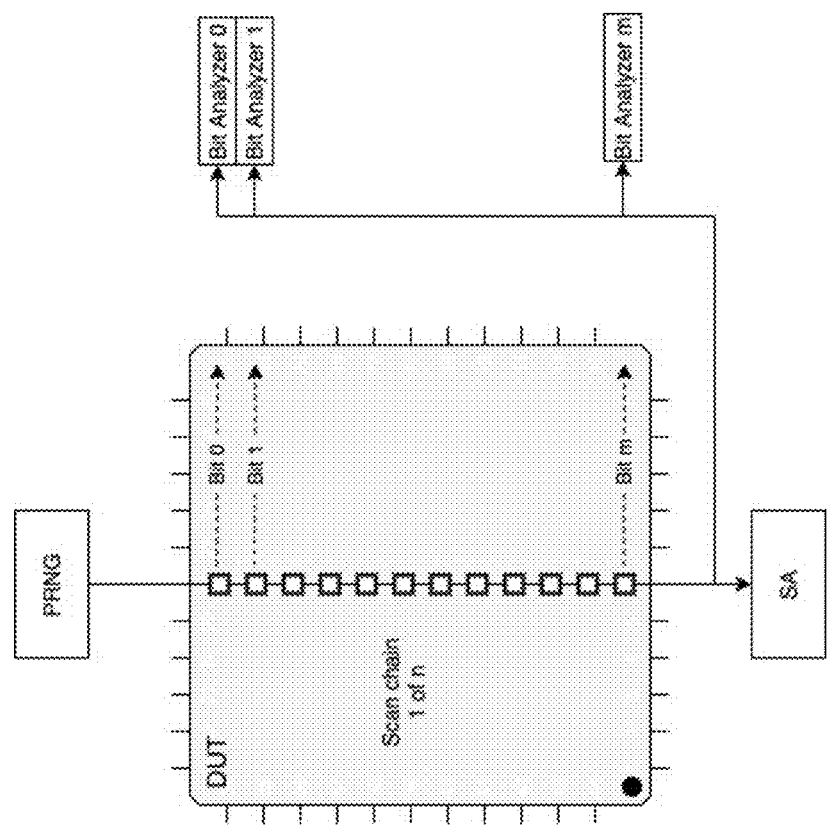
FIG. 10 is a simplified logic diagram showing bit-level signature analyzers in a test bench system in an embodiment.

Referring to FIG. 1, method 100 may include augmenting 175 a test bench system to enable comprehensive bit-level signature analysis. In an embodiment, such bit level signature analysis may be performed without incurring an additional test time penalty. As shown in FIG. 10, augmenting 175 may include adding a bit-level signature analyzer ("Bit SA") for each flip-flop in each scan chain in the device, including all primary outputs for the device. Augmenting 175 may include each flip-flop in each scan chain connecting the input for each Bit SA to the corresponding scan out pin associated with the scan chain. All primary outputs of the device thus may be similarly connected to corresponding, individual Bit SA's. Referring to FIG. 1, method 100 may include fifth executing 180 the augmented test bench system including comprehensive bit-level signature analyzer's ("Bit SA's") to enable bit-level signature capture and analysis of each flip-flop in each scan chain and all primary outputs of the device. It will be understood that fifth executing 180 may include executing the exhaustive test algorithm on the golden device with all Bit SA's enabled to capture the values of each corresponding flip-flop or primary output. Method 100 may further include recording 185 the bit-level signature contents of all Bit SA's for each flip-flop in each scan chain and all outputs of the device, captured during execution of the exhaustive testing algorithm. The recorded bit-level signature contents may be stored in a suitable database. It will be understood that at conclusion of the exhaustive testing for a golden device, the contents of each Bit SA will constitute a golden signature for each logic cone and primary output in the golden design, which may be stored in a database and available to be interrogated in the future for testing untrusted devices in relation to the golden device. Again referring to FIG. 1, method 100 may include second interrogating 190 an untrusted device categorized as failing (or "failing device") to isolate a particular failure. Second interrogating 190 may be identical to first interrogating 130, except as otherwise disclosed herein or required by context. A failing device may be then placed into a lab tester augmented with this diagnostic capability. Second interrogating 190 a failing device to isolate a particular failure may include testing the failing device on a lab test bench implemented in hardware, where the lab test bench implemented in hardware is augmented with bit SA's configured to monitor and record each flip-flop in each scan chain and all outputs of the failing device to enable isolation of particular failures in the device. Referring to FIG. 1, method 100 may include third comparing 195 bit SA results of second interrogating 190 a failing device to isolate a particular failure. Third comparing 195 may be identical to second prime comparing 170, except as otherwise disclosed herein or required by context. For each failing device, Bit SA results may be compared against the golden device Bit SA results. Each mismatch of the compared Bit SA results for the failing device and known golden device may represent a fault in the logic cone associated with a (bit) flip-flop or primary output corresponding to the Bit SA of the failing device.

Referring to FIG. 1, method 100 may include reconstructing 200 a logical cause of each particular failure isolated in a failing device. Reconstructing 200 may include performing further diagnostic steps to reconstruct the precise nature of the failure. In an embodiment, reconstructing 200 may be performed without re-running the exhaustive test algorithm. In an embodiment, the logical cause of a failure may be determined by reconstruction of a logic cone having a fault. The logical cause of a particular failure may be determined by reference to information including the known golden design, such as the golden netlist, for the device, and the database of all Bit SA's recorded for each flip-flop in each scan chain and all outputs of the failing device when performing a full set of test vectors of the exhaustive test algorithm. The owner thus may possess all information needed to reconstruct the logical cause of the failure in a failing device. The method 100 may be enhanced by the diagnostic capability of a test bench system having a test bench second extension as disclosed hereinabove. It is noted that, in an embodiment, no additional test time penalty is incurred for the aforementioned diagnostic capability.

Figure 8:
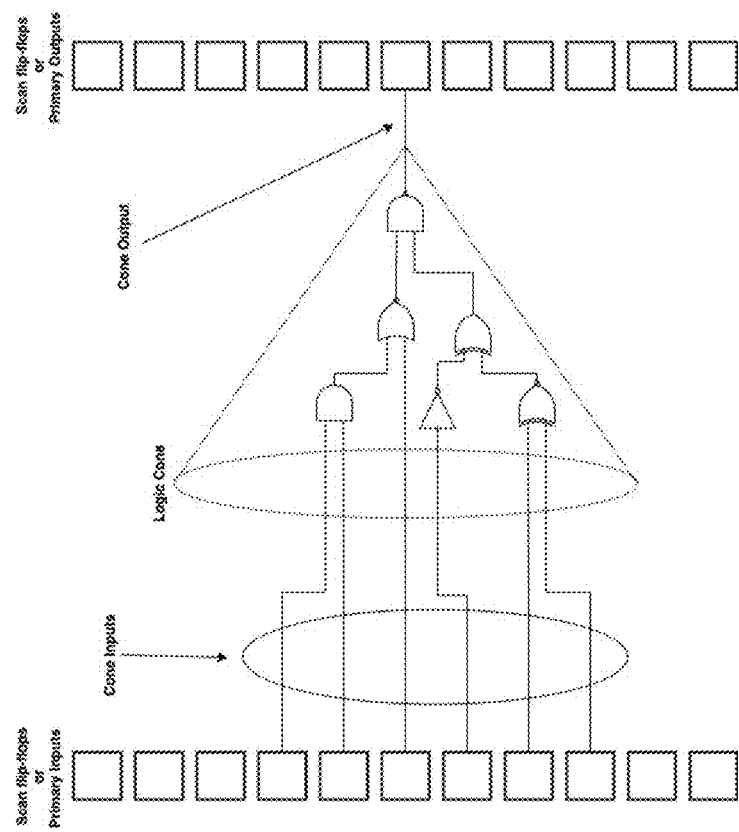
FIG. 8 is a simplified logic diagram showing the structure of a typical logic cone in a device.
Figure 11:
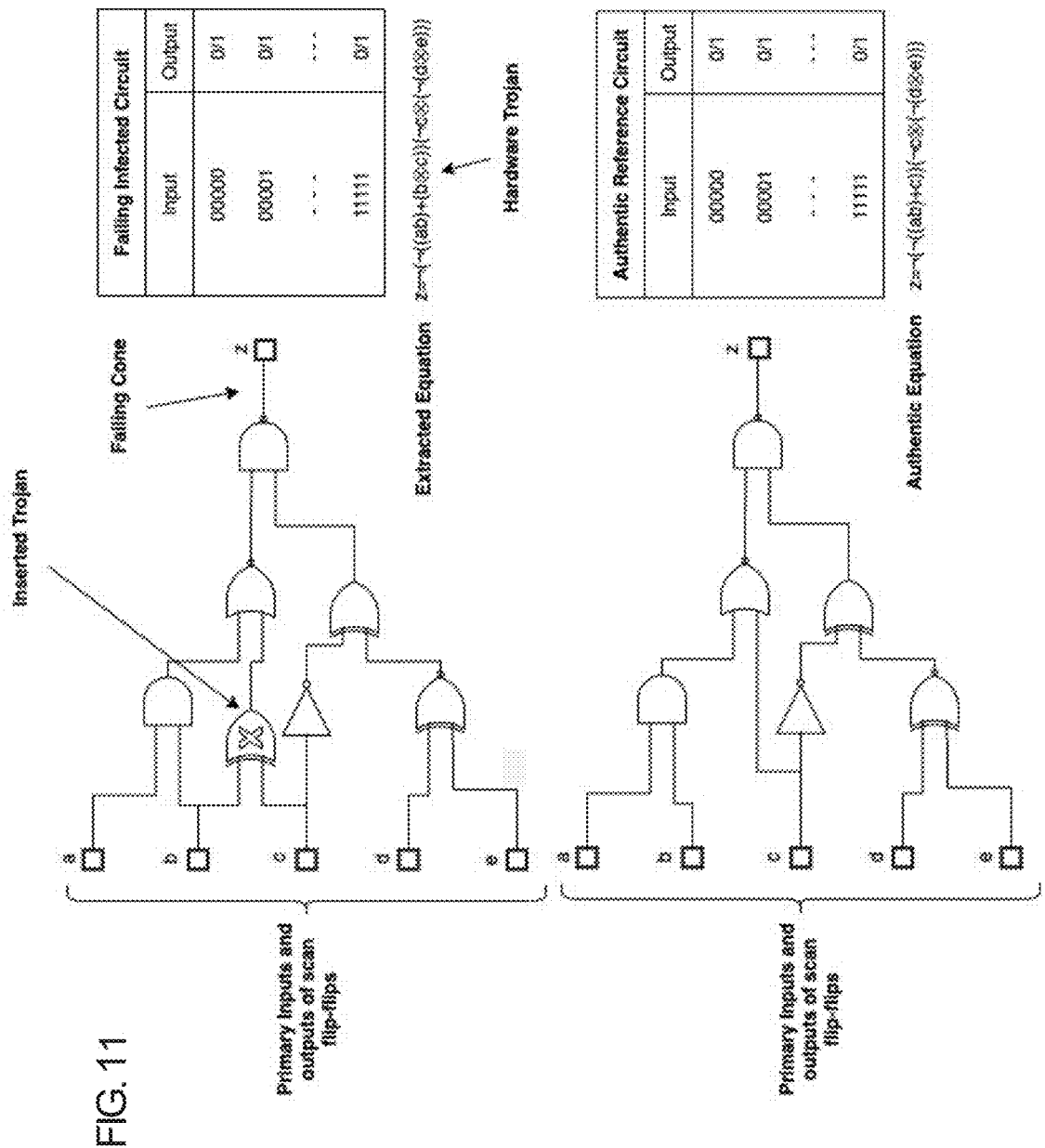
FIG. 11 is a simplified logic diagram showing reconstruction of logic of a failing device in an embodiment.

As shown in FIG. 1, method 100 may include acquiring 205 essential reconstruction information which is sufficient to reconstruct a particular logical failure in a failing device. Such essential reconstruction information may include: for each cone output (which may be captured in a Bit SA), all of the primary inputs to that cone, including primary inputs or outputs of other scan flip-flops. One suitable configuration of Bit SA's is shown in FIG. 8. Such acquiring may be performed to acquire the essential reconstruction information, sufficient to precisely reconstruct each logical failure. In an embodiment, reconstructing 200 may be performed without re-running the exhaustive test algorithm. Acquiring 205 may include, for each of the logic cone(s) or primary output(s) identified in second interrogating 190, constructing two empty truth tables based on the known golden design, such as the golden netlist, for the device. As shown in FIG. 11, inputs to the truth tables may be the cone inputs and output may be the cone outputs, for the exhaustive test algorithm. The exhaustive test algorithm may be run to capture values for the golden cone truth table for a golden logic cone associated with the failing Bit SA, and to capture the failing cone truth table for the failing device, In an embodiment, acquiring 205 may include for the golden device or netlist, and for the failing device, running the test with an exhaustive test algorithm. The exhaustive test algorithm, in an embodiment, may be a modification of the exhaustive test algorithm in the first executing 112, to capture the truth table for a golden cone associated the failing Bit SA:

```
initialize PRNG's with seeds
initialize Bit SA's to zero
reset design-under-test (DUT)
loop for 65536
    scan in new PRNG pattern for m clocks and
        simultaneously scan out result of previous pattern
    execute one non-scan clock
    store the value for Bit SA's associated with the failing
        cone inputs and output into the golden cone truth table
    initialize Bit SA's to zero
    break loop if all entries truth table is be completed
end loop
```

Acquiring 205 may include, for the failing device, running the same test by performing the exhaustive test algorithm with the failing device. Acquiring 205 may be performed with the test bench system with test bench second extension. The test bench system with test bench second extension is augmented with Bit SA's for all primary inputs and outputs to capture the Bit SA values for the failing cone inputs and outputs, which may populate the failed cone truth table. Referring to FIG. 1, reconstructing 200 may include using Boolean logic minimization techniques with the golden cone truth table and failing cone truth table, to reconstruct the logic equations of the failing cone and compare the reconstructed logic equations of the failing cone with the reconstructed golden cone logic equations of the golden cone. Such comparison is shown, for example, in FIG. 11.

Figure 12:
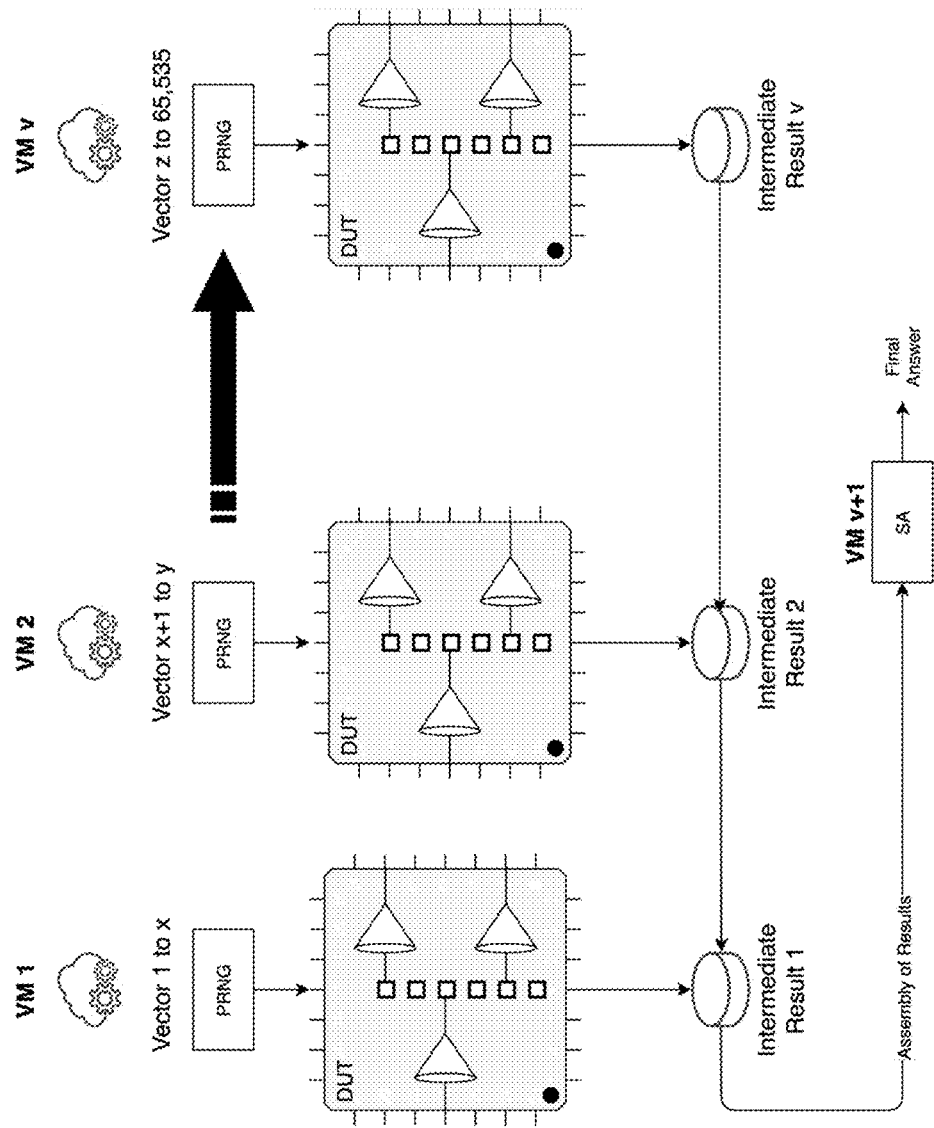
FIG. 12 is a simplified flow diagram showing parallelization of the application of input test patterns and compression of the netlist model's output by a signature analyzer in simulation of netlist testing of a device in an embodiment.

Referring to FIG. 1, method 100 may include accelerating 220 the testing of an untrusted semiconductor device by performing an exhaustive test algorithm to detect malicious modifications. Accelerating 220 may include, in an embodiment, accelerating netlist simulation, and reducing test time, by parallelization of simulations. In an embodiment, parallelization may be enabled by cloud computing. Parallelization by cloud computing may include enabling split, parallel execution of test benches in separate, parallel simulations. As shown, for example, in FIG. 17, parallelization may greatly reduce simulation time. This may be especially useful for very large device designs. Accelerating 220 may be achieved, for example, by operation of a system as shown in FIG. 12. In an embodiment, accelerating 220 may include generating 225 an augmented, accelerated test bench. As shown in FIG. 12, for example, a suitable test bench will execute 65,536 loops of m+1 clocks per the algorithm in Step 4.

Generating 225 the augmented, accelerated test bench may include constructing $$\frac{65{,}536}{v}$$

test benches by calculating the correct Seed for each PRNG of each test bench based on the value of that PRNG as if the loops were run contiguously. Generating 225, as described herein, assumes that v-number of cloud (or compute farm) virtual machines are available for simulation. Generating 225 may include, for example, with v test benches and virtual machines, the first testbench and VM (VM1) will execute with PRNG's set to the initial seed value $p_0$ and be clocked $$\frac{65{,}536}{v} \times (m+1)$$

times, at the end of which the PRNG will contain the value of $p_1$. The second test bench and VM (VM2) will have its PRNG's set to $p_1+1$, which would have been the next number in the contiguous sequence. The remaining test benches and VM's will follow the same pattern until the last VM executes the final pattern in the 65,536 loops. As the test executes, the results of the scan out operation may be not only captured into SA's and Bit SA's, but stored in addition as either ASCII or binary data associated with the VM that generated it. Such results may be intermediate results. After all VMs have completed tests, another VM re-assembles the Intermediate Results into a final SA and Bit SA values. Efficiencies and scaling effect of parallelization are shown, for example, in FIGS. 17*a*, 17*b*, 17*c* and 17*d* showing in four charts the projected test times for devices, ranging from very small to very large, being tested on a lab bench (Bench Tester Time), manufacturing tester (Tester Time), single simulation (Sim Time (single)), and cloud-scaled simulation (Sim Time (Cloud Scaled)) that illustrates the scaling effect of parallelization of simulation by adding VM's.

Referring to FIGS. 1 and 13, generating 225 test benches may be automated and embodied in testbench generator application software. High-level information used to generate the test benches may be determined. The information may include, without limitation: 1) the number of scan chains in the design, 2) the length of the longest scan chain, 3) seed values for each PRNG in the test bench, 4) number of simulations to be run in parallel, and 5) whether or not to augment the basic apparatus with diagnostic features such as Bit SA's. The information may be written in a configuration file that may be readable by the test bench generator application software. The test bench generator application software may automatically create one or more test benches, based on the number of parallel simulations to be run. For a single simulation, one test bench may be created. For v-number of simulations to be run in a cloud-based environment or a compute farm, v test benches may be created. Simulation(s) sufficient to generate a signature for the device (DUT) being tested to detect modifications, are performed. Where the DUT is a golden device, the golden answer may be recorded along with diagnostic data. Where the DUT is an untrusted device, the test may be executed and a PASS/FAIL determination may be made based on comparison with the golden answer. In case of a FAIL determination, the diagnostic information gathered from the test may be used to isolate and reconstruct the failed logic. An analysis tool may be also automatically generated, which may provide detailed information for each failing cone may enable reconstructing 200 of the logic of the failing cone. The analysis tool may provide a failure analysis truth tables and Boolean logic equations for each failing logic cone in the failing device, and the same for the corresponding golden logic cone in the golden device.

Figure 2:
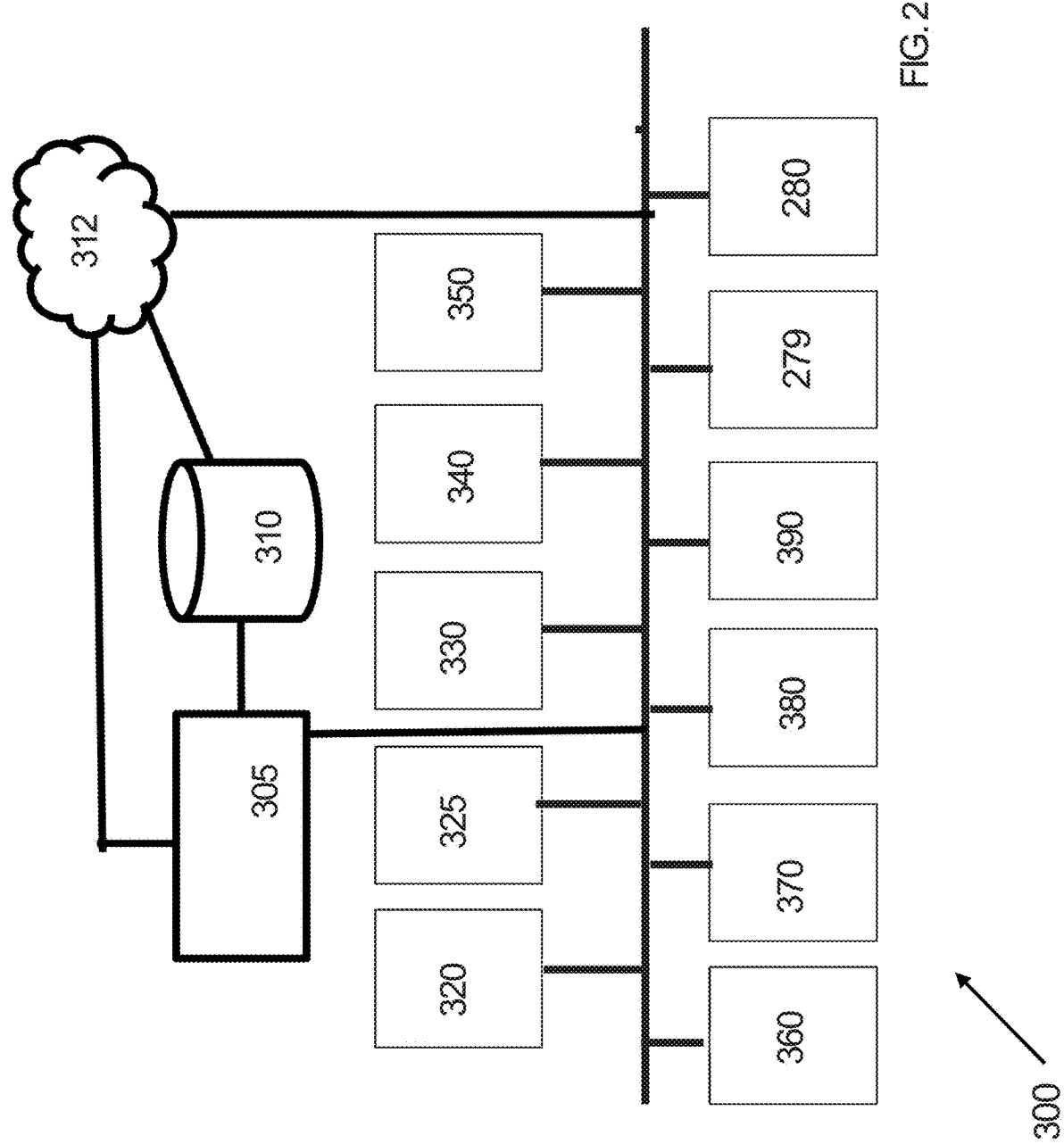
FIG. 2 is a simplified block diagram of a computer-implemented detection system capable of detecting a modification in a semiconductor device, in an exemplary embodiment.

FIG. 2 is a simplified block diagram of a computer-implemented detection system 300 capable of detecting a modification in a semiconductor device, in an exemplary embodiment. System 300 may include a processor 305 operable to perform instructions in relation to memory 310, where such instructions, without limitation, may relate to device simulation, creating test benches, performing an exhaustive testing algorithm, recording outputs and inputs, signature analysis, analytics, categorization of identical devices, detection of failing devices that include a malicious modification, locating failures, and reconstructing failures. Processor 305 and/or memory 310 may be implemented in local hardware form, or may be implemented in a network cloud, such as in cloud servers over a network infrastructure 312. System 300 is capable of performing the steps of computer-implemented detection method 100 as disclosed herein for detecting a modification in a semiconductor device, or similar detection method. System 300 may include a constrained design 320 model, which may be a netlist, of a semiconductor device, configured for testing according to an exhaustive test algorithm. System 300 may include a plurality of PRNG's 325 connected to each of the n scan chain inputs of the constrained design. System 300 may include an exhaustive test algorithm 330 configured to provide a full set of input test vectors to be performed. System 300 may include a test bench system 330 including a plurality of SA's configured to monitor device outputs to be recorded. System 300 may include a test bench first extension 340 including a plurality of Bit SA's configured to monitor each flip-flop in each scan chain and all outputs to be recorded. System 300 may include a test bench second extension 350 including a plurality of Bit SA's configured to monitor all primary inputs and outputs to be recorded, and a hardware implementation (such as an FPGA) of a golden device suitable for execution on a lab test bench for comparison to an untrusted device embodied in a physical article of manufacture. System 300 may include a categorization algorithm 360 for determining either that an untrusted device is identical to a golden device, or detecting that the untrusted device is a failing device that differs from the golden device and contains a malicious modification. System 300 may include a failure locating algorithm 370 for determining the particular location of a failure in a failing device. System 300 may include a reconstruction algorithm 380 for determining the particular logical failure at a failure location identified in a failing device. System 300 may include a test bench accelerator 390 configured generate a plurality of test benches capable of executing an exhaustive test algorithm in an accelerated manner.

Figure 3:
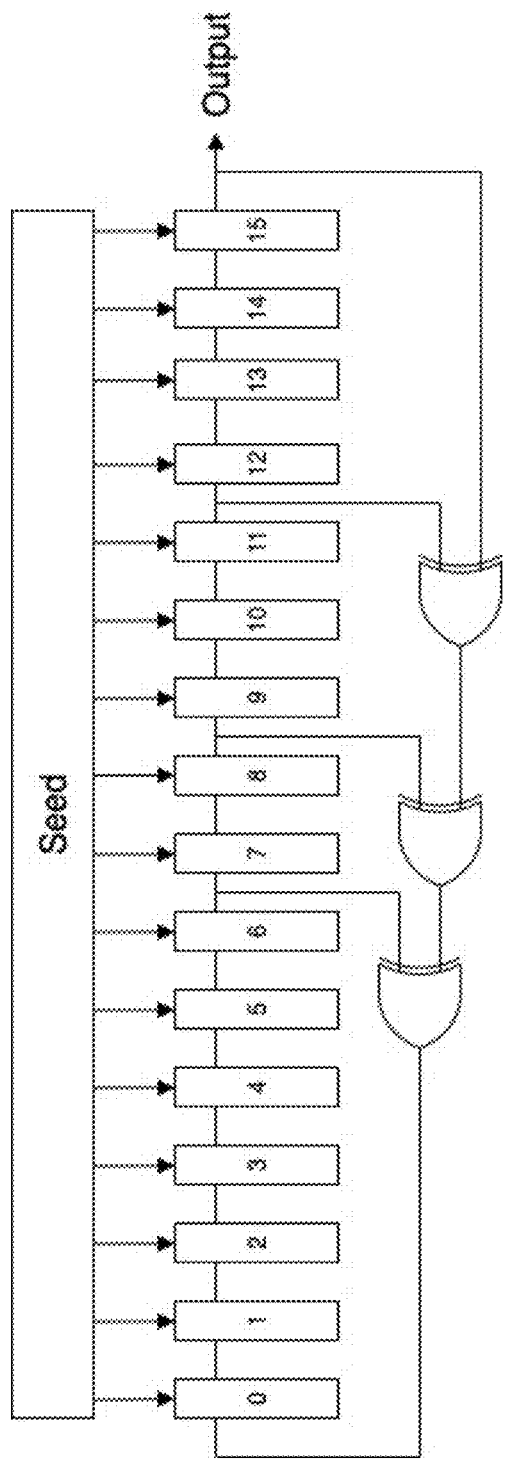
FIG. 3 is a simplified logic diagram of a linear feedback shift register (LFSR) configured as a Pseudorandom Number Generator (PRNG) in an embodiment.

FIG. 3 is a simplified logic diagram of a linear feedback shift register (LFSR) configured as a Pseudorandom Number Generator (PRNG) in an embodiment. Shown in FIG. 3 is an example of a 16-bit linear feedback shift register (LSFR) that implements the characteristic polynomial $P(X)=X^{16}+X^{12}+X^7+X^4+1$ which corresponds to the feedback equation $X^{16}+X^{12}+X^7+X^4+1$ and generates a maximum length pattern sequence of $2^{16}-1$ bits. Different polynomials and LSFR lengths may be employed based on the desired behavior for a given application.

Figure 4:
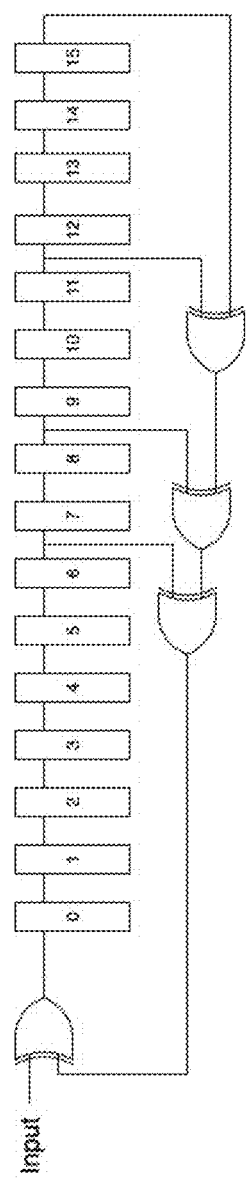
FIG. 4 is a simplified logic diagram of an LFSR configured as a Signature Analyzer (SA) in an embodiment.

FIG. 4 is a simplified logic diagram of an LFSR configured as a Signature Analyzer (SA) in an embodiment. The LSFR uses the same polynomial shown in FIG. 3 to compress an incoming bit stream into a 16-bit number and is commonly referred to as a Signature Analyzer (SA). All single bit errors are detected with 100% accuracy. Multiple-bit errors have a statistical probability of escaping detection roughly on the order $$\frac{1}{2^{LSFR-Length}}.$$

Different polynomials and LSFR lengths may be employed to reduce the possibility of such escapes.

Figure 5:
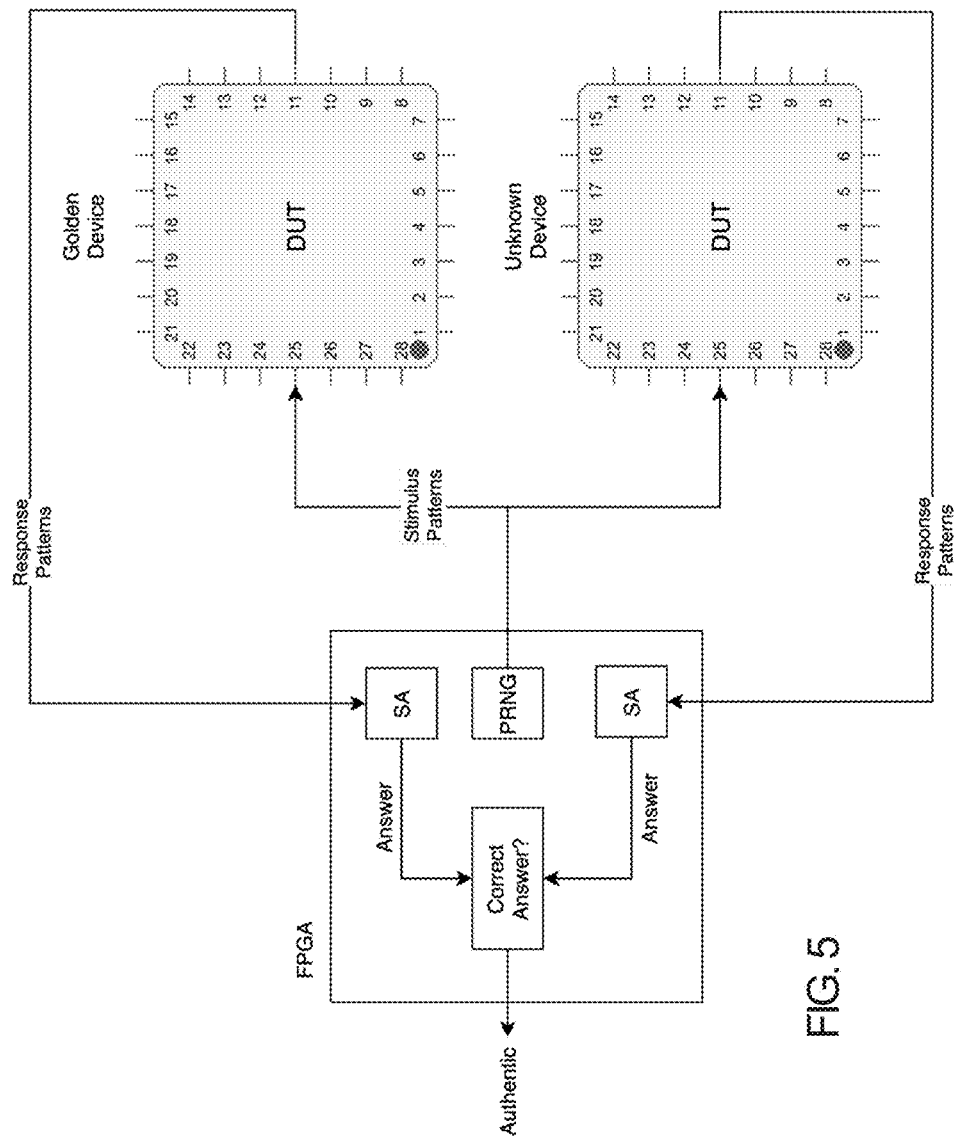
FIG. 5 is a simplified schematic diagram of an external test bench system implemented in FPGA hardware in an embodiment capable of testing manufactured devices to verify an unknown device against a known-correct golden reference device.

FIG. 5 is a simplified schematic diagram of an external test bench system implemented in FPGA hardware in an embodiment capable of testing manufactured devices to verify an unknown device against a known-correct golden reference device. The test bench system includes one or more PRNG(s) to apply a stimulus pattern to the golden device, which then responds with a pattern corresponding to the internal composition of the logic contained in that device, to perform an exhaustive test algorithm. The response is compressed by a signature analyzer that compresses the total response of all applied stimulus patterns into a single "answer." The same stimulus patterns can be applied to an unknown device and its answer compared to the golden device to determine whether the unknown device is authentic.

Figure 6:
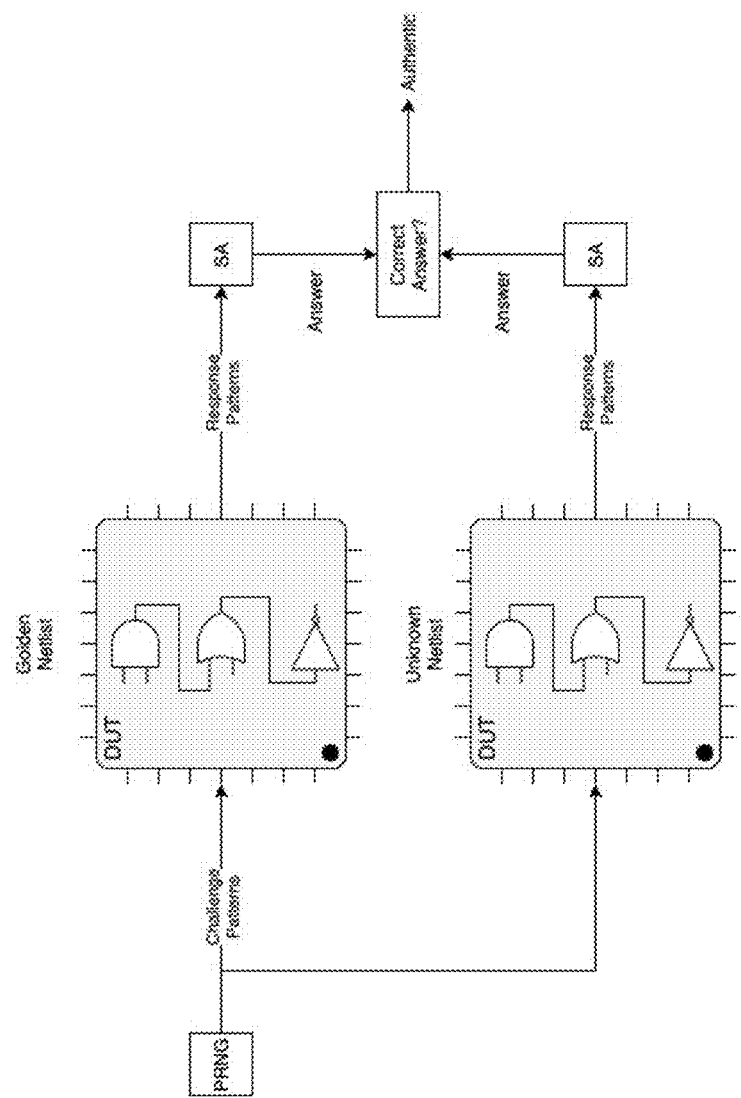
FIG. 6 is a simplified computer-implemented testing simulator capable of testing a model of a device, such as a netlist, in a digital simulation.

FIG. 6 is a simplified computer-implemented testing simulator capable of testing a model of a device, such as a netlist, in a digital simulation.

FIG. 7 is a simplified schematic diagram of test bench system embedded inside a device in an embodiment capable of testing manufactured devices without an external test bench system.

FIG. 8 is a simplified logic diagram showing the structure of a typical logic cone in a device and more particularly illustrating that performing the exhaustive test algorithm fully exercises a logic cone. In this illustrated example, the logic cone consists of six inputs which can be exhaustively verified by application of $2^6$ or 64 unique patterns.

Figure 9:
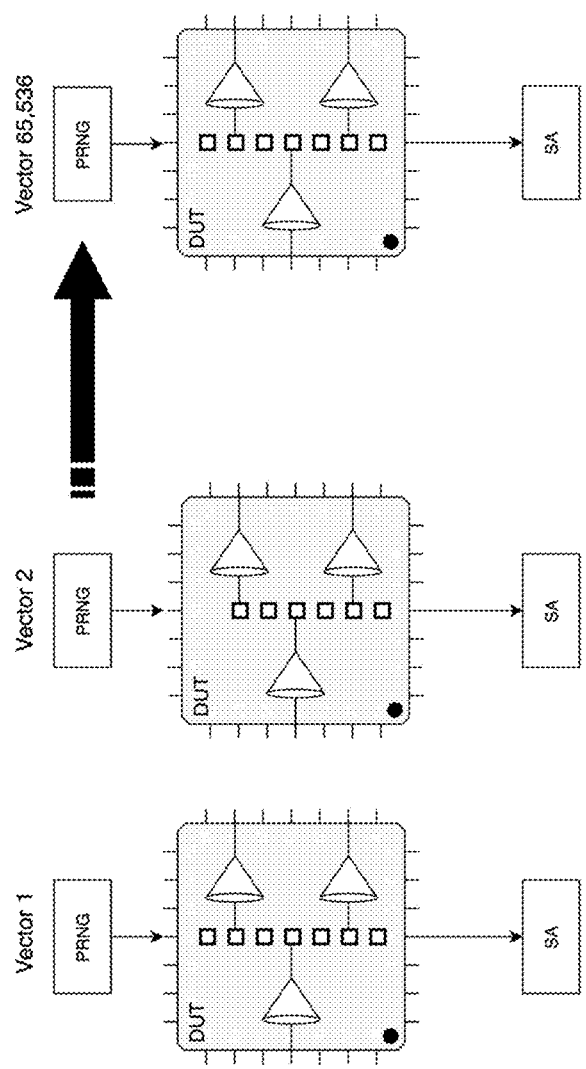
FIG. 9 is a simplified flow diagram showing the iterative application of input test patterns resulting in an exhaustively test of a netlist model and compression of the netlist model's output by a signature analyzer, in an embodiment.

FIG. 9 is a simplified flow diagram showing the iterative application of input test patterns resulting in an exhaustively test of a netlist model and compression of the netlist model's output by a signature analyzer, in an embodiment. FIG. 9 particularly shows that patterns are applied to all primary inputs and scannable flip-flops and compressed by a signature analyzer. Each scan in/clock/scan out sequence represents a test vector. This process is repeated until $2^{16}$ (65,536) vectors have been applied, exhaustively verifying the entire device.

FIG. 10 is a simplified logic diagram showing bit-level signature analyzers in a test bench system in an embodiment. Illustrated, more particularly, is a diagnostic mode, with signatures for each cone output being collected by a bit-level analyzer and compared against a golden reference for that bit in order to determine the source, or sources of logic that that caused the device to fail its authenticity test. This functionality is implemented using a "Bit SA" which is a SA that mirrors the data captured from a bit from an internal scan chain flip-flop which captures a logic cone output. As data is scanned out of the chip, the bit value is added to the CRC value captured by the Bit SA. The final signature in the Bit SA can be used for diagnostic purposes in determining which internal logic cone output is failing.

FIG. 11 is a simplified logic diagram showing reconstruction of logic of a failing device in an embodiment. FIG. 11 shows that when a failing cone is located or isolated in a DUT, the logic of that cone can be reconstructed by extracting a truth table and comparing it against the cone equation from an authentic device. The authentic equation is: $z=\neg(\neg((ab)+c))(\neg c \otimes (\neg (d \otimes e)))$ while the failing equation of an infected circuit is extracted and found to be: $z=\neg(\neg((ab)+(b \otimes c))(\neg c \otimes (\neg (d \otimes e)))$.

FIG. 12 is a simplified flow diagram showing parallelization of the application of input test patterns and compression of the netlist model's output by a signature analyzer in simulation of netlist testing of a device in an embodiment. FIG. 12 shows that a simulation of the netlist can be accelerated in a cloud computing environment with multiple virtual machines (VM). The 65,536 simulation vectors are divided into v-number of available VM's and run in parallel and write the intermediate response patterns to a file or memory. After the simulation is completed, the intermediate results are re-assembled by one additional VM to compute the final answer.

FIG. 13 is a simplified flow diagram showing automated generation of test benches and automatic generation of tools for analyzing failing tools in an embodiment. FIG. 13 shows the automatic generation of all needed test benches and analytics structures based on a set of inputs describing the circuit at a high level.

Figure 14:
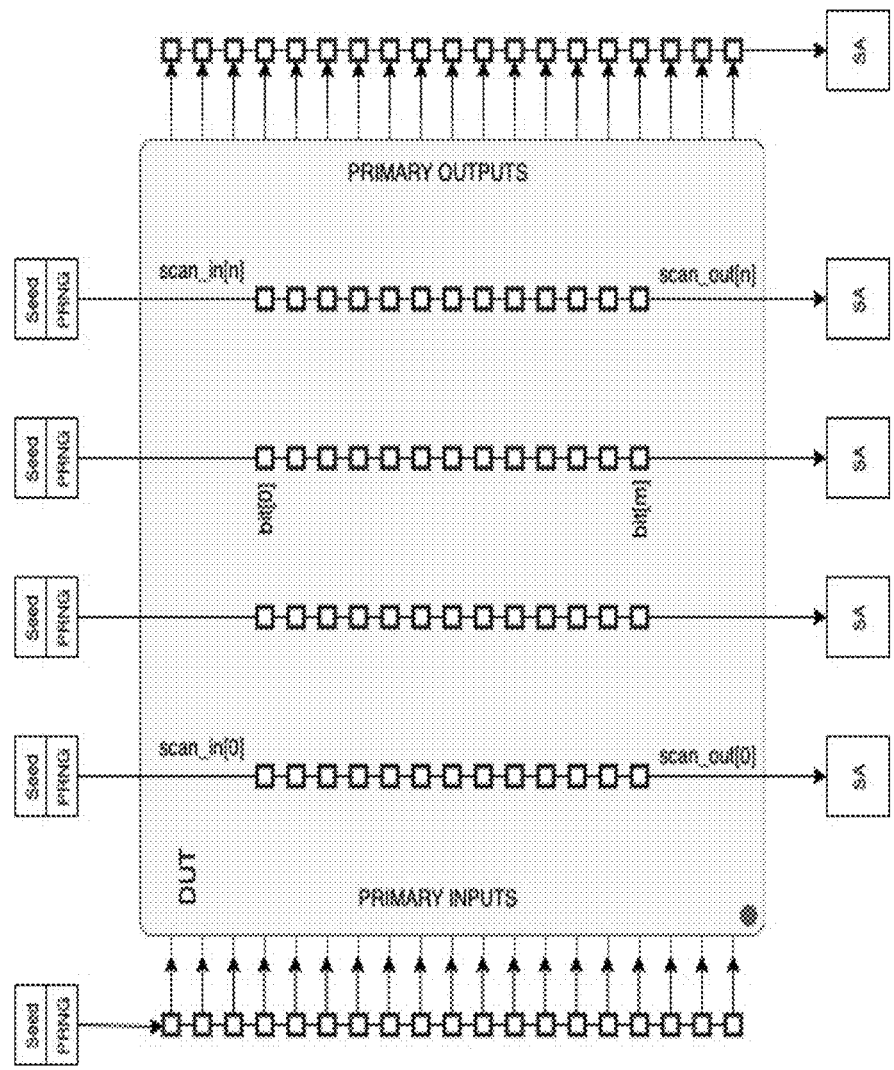
FIG. 14 is a simplified schematic diagram showing a test bench having canonical structure with multiple signature analyzers, in an embodiment.

FIG. 14 is a simplified schematic diagram showing a test bench having canonical structure with multiple signature analyzers, in an embodiment. Shown is the canonical structure of the test bench. All primary inputs are connected to a shift register which is connected to a PRNG. All primary outputs are connected to the input of a scannable shift register. All scan inputs are connected to a PRNG. Scan outputs of the scan chains and the output of the primary output shift register are connected to a separate SA.

Figure 15:
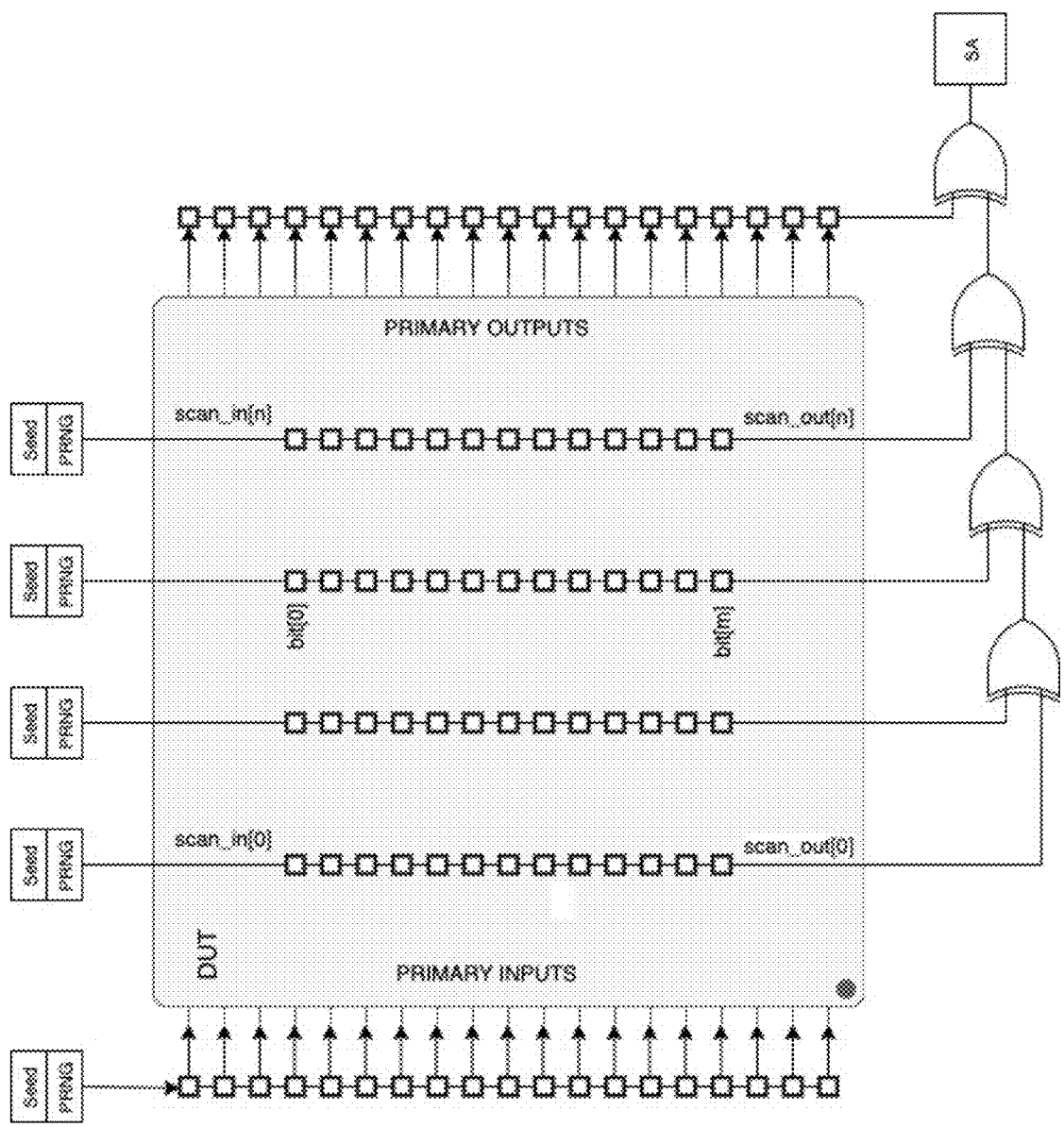
FIG. 15 is a simplified schematic diagram, similar to FIG. 12, showing a test bench having canonical structure with a single signature analyzer, in an embodiment.

FIG. 15 is a simplified schematic diagram, similar to FIG. 14, showing a test bench having canonical structure with a single signature analyzer, in an embodiment. Shown is an implementation of a test bench system as generally shown in FIG. 14 where all outputs from the scan chains and the primary output shift register are consolidated into a single SA.

Figure 16:
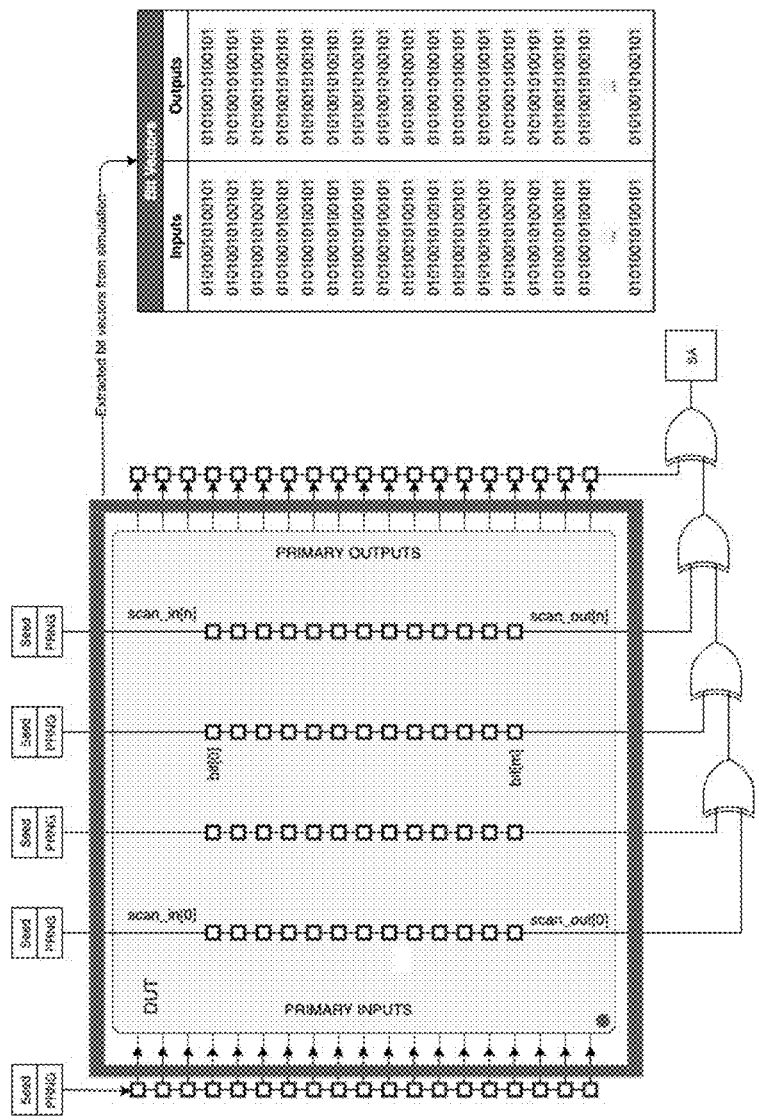
FIG. 16 is a simplified flow diagram showing automated extraction of inputs and outputs patterns from simulation of a netlist model, to enable execution of patterns on a manufacturing tester, in an embodiment.

FIG. 16 is a simplified flow diagram showing automated extraction of inputs and outputs patterns from simulation of a netlist model, to enable execution of patterns on a manufacturing tester, in an embodiment. Shown in FIG. 16, particularly, is that primary inputs, primary outputs, scan chain inputs, and scan chain outputs are extracted in simulation to create bit-level vectors that can be executed on a manufacturing tester.

FIGS. 17a, 17b, 17c and 17d are bar charts showing relative speed for four testing methods for detecting modification of a semiconductor device in embodiments. Shown particularly are testing by a chip tester, lab test jig, single-threaded simulation, and a parallel, cloud-based simulation. Simulation may be greatly reduced with the cloud-based approach, for example by using an increasing number of virtual machines where designs increase in size.

FIG. 18 is a simplified flow diagram showing a method for detecting modification of a manufactured semiconductor device by simulation, of extracted test vectors from exhaustive testing of a known golden design, on the manufactured device on a tester. Particularly shown in FIG. 18 is a method as disclosed, using extracted test vectors in a manufacturing setting. The golden design is stimulated as disclosed herein to generate test vectors. The generated test vectors can be then provided to a tester which will "replay" the simulation patterns against the untrusted manufactured device. If the design has been modified during the manufacturing phase to produce a modified device, the tester will detect such malicious modification(s). In an embodiment as shown, the tester also may detect manufacturing defects when detecting malicious modification(s).

FIG. 19 is a simplified flow diagram similar to FIG. 18, showing a method for detecting modification of a manufactured semiconductor device in an assembled system, by application of extracted test vectors from exhaustive testing of a hardware implementation of a known golden design, to the manufactured device on a laboratory test bench. Shown particularly in FIG. 19 is a method of receiving untrusted devices from manufacturing, and testing the same on a lab test bench as herein disclosed, to produce a signature of the untrusted manufactured device that may be compared with a golden signature to determine authenticity of the untrusted manufactured device as identical to the golden device, or to detect malicious modification of the untrusted device.

While this disclosure uses the typical polynomial length of 16 for both PRNG's and SA's, this value may be arbitrary and may be considered to be one typical to be used in practice. However, PRNG's and SA's may be of longer or shorter length and non-equal. There may be some applications where certain values may provide a more optimal implementation, for example, smaller PRNG's may offer shorter test times, while longer SA's may offer reduced probability of undetected errors.

Furthermore, in embodiments, while the disclosure shows one polynomial for the PRNG to generate a maximum length sequence and the same polynomial for spreading errors across a SA, a large number of polynomials choices may achieve suitable results.

Apparatus, methods and systems according to embodiments of the disclosure are described. Although specific embodiments are illustrated and described herein, it will be appreciated by those of ordinary skill in the art that any arrangement which is calculated to achieve the same purposes can be substituted for the specific embodiments shown. This application is intended to cover any adaptations or variations of the embodiments and disclosure. For example, although described in terminology and terms common to the field of art, exemplary embodiments, systems, methods and apparatus described herein, one of ordinary skill in the art will appreciate that implementations can be made for other fields of art, systems, apparatus or methods that provide the required functions. The invention should therefore not be limited by the above-described embodiments, methods, and examples, but by all embodiments and methods within the scope and spirit of the invention.

In particular, one of ordinary skill in the art will readily appreciate that the names of the methods and apparatus are not intended to limit embodiments or the disclosure. Furthermore, additional methods, steps, and apparatus can be added to the components, functions can be rearranged among the components, and new components to correspond to future enhancements and physical devices used in embodiments can be introduced without departing from the scope of embodiments and the disclosure. One of skill in the art will readily recognize that embodiments are applicable to future systems, future apparatus, future methods, and different materials.

All methods described herein can be performed in a suitable order unless otherwise indicated herein or otherwise clearly contradicted by context. The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

Terminology used in the present disclosure is intended to include all environments and alternate technologies.

What is claimed is:

1. A detecting method capable of detecting a modification in a semiconductor device, said method comprising:
    first applying, by an algorithm executed in a computer simulation, an exhaustive first set of patterns to inputs of a model of an original semiconductor device, said exhaustive first set of patterns developed by a pseudo-random number generator initialized with seed values;
    first producing, by said computer simulation, a first set of response patterns from outputs of said model;
    first compressing, by a signature analyzer, said first set of response patterns to provide to a first cyclic redundancy code in relation to said first applying;

second applying, by by a hardware implementation of
said algorithm and said pseudorandom number generator, an identical exhaustive set of patterns to inputs of
a manufactured physical device of said design;
second producing, by said hardware implementation, a
second set of response patterns from outputs of said
physical device;
second compressing, by a signature analyzer in said
hardware implementation, said response patterns to
provide to a second cyclic redundancy check code in
relation to said second applying;
comparing, by said hardware implementation, said second
cyclic redundancy check code to said first cyclic redundancy check code to determine one of identity or
non-identity of said second cyclic redundancy check
code to said first cyclic redundancy check code; and
categorizing, by said hardware implementation, said
physical device in relation to said comparing, said
categorizing further comprising:
failing, if said comparing determines non-identity, of
said physical device; and
passing, if said comparing determines identity, of said
physical device.

2. A detecting method of claim 1, said method further comprising:
first preparing the original semiconductor design for
simulation, said first preparing further comprising:
first imposing a set of detection testing constraints in
said design.

3. A detecting method of claim 2, said method further comprising:
said first imposing said set of design constraints in said
original semiconductor design further comprising:
placing flip-flops in scannable condition;
placing latches in one of scannable condition and
transparent condition;
fencing non-digital logic to provide a deterministic
response to each applied pattern;
fencing non-digital memory to provide a definite
response to each applied pattern;
sizing logic cones to not exceed length of pseudorandom number generators used for automatically generating patterns; and
configuring digital logic to reset to a consistent state
prior to pattern application.

4. A detecting method of claim 2, said method further comprising:
said first imposing said set of design constraints in original semiconductor design further comprising:
first insertion into the netlist for manufacturing testing
by the following:
performing scan insertion into a final netlist with all
flip-flops organized into n-number scan chains of
maximal m-length, wherein n and m relate to
design characteristics of said design; and
fencing non-digital elements to produce, from said
netlist under test, repeatable responses when patterns are applied.

5. A detecting method of claim 1, said method further comprising:
first generating a hardware design model of a test system
configured to perform steps of said detecting method;
and
second simulating, said system to establish the identity of
an original semiconductor device design.

6. A detecting method of claim 5, said method further comprising:
said first generating further comprising said test bench
capable of accelerating the simulating of said detecting
method by generating a plurality of testbenches executable by cloud servers.

7. A detecting method of claim 5, said method further comprising:
said first generating a test bench system to perform steps
of said detecting method as follows:
connecting to each of said n-number scan chain inputs
of the original device, an output pin of a corresponding pseudorandom number generator of the test
bench system;
connecting to each of said n-number scan chain outputs
of the original device, an input pin of a corresponding signature analyzer of the test bench system;
connecting each primary input pin of said device to a
corresponding primary output pin of the test bench
system; and
connecting to each primary output pin of said device to
a primary input pin of the test bench.

8. A detecting method capable of detecting modification
in a semiconductor device, said method comprising:
first generating a test bench system to perform steps of
said detecting method;
executing, by said test bench system, an exhaustive design
under test (DUT) algorithm;
first extracting, in relation to said executing, a full set of
input patterns (input vectors) applied to the netlist
golden model under test on said test bench system;
second extracting, in relation to said executing, a full set
of output patterns (output vectors) generated by applying the full set of input patterns (input vectors) to check
functioning of the netlist golden model under test on
said test bench system;
performing, by a signature analyzer, compression to provide cyclic redundancy code (CRC) in relation to said
first extracting and said second extracting;
categorizing, by a processor, in relation to said first
applying and said second applying, said physical integrated circuit in relation to the netlist golden model,
said categorizing further comprising one of:
failing, if said categorizing determines non-identity,
said semiconductor device; and
passing, if said categorizing determines identity, said
semiconductor device.

9. A computer-implemented detecting method of claim 8,
further comprising:
said executing, by a test bench system, an exhaustive
design under test (DUT) algorithm, said algorithm
consisting of the following:
initializing each pseudorandom number generator with
seed values;
initializing each signature analyzer to zero;
resetting design under test (DUT);
looping for 65536 cycles;
simultaneously scanning in new pseudorandom number
generator pattern for (m) clocks and scanning out
result of previous pattern;
executing one non-scan clock; and
ending loop.

10. A computer-implemented detecting method of claim
1, further comprising:
first generating a test bench system to perform steps of
said detecting method;

executing, by said test bench system, an exhaustive design under test (DUT) algorithm, said algorithm consisting of the following:
  initializing each pseudorandom number generator with seed values;
  initializing each signature analyzer to zero;
  resetting design under test (DUT);
  looping for 65536 cycles;
  simultaneously scanning in new pseudorandom number generator pattern for (m) clocks and scanning out result of previous pattern;
  executing one non-scan clock; and
  ending loop.

11. A detection system capable of detecting a modification in a manufactured physical device, said detection system comprising:
  an application to automatically generate the hardware design of the detecting method of claim 1.

12. A hardware implementation of said design comprising:
  executing, autonomously without a processor the method of claim 1.

13. An automated design system for automated design of a semiconductor device, said automated design system comprising:
  an application configured to perform the detecting method of claim 1.

14. A computer-implemented manufacturing method capable of providing an authenticated semiconductor device, said manufacturing method comprising:
  producing, by a processor, said semiconductor device comprising an integrated circuit (IC) from an IC manufacturing file generated by an electronic design automation (EDA) tool in relation to an IC design file;
  providing, by a processor, said IC design file by performing the computer-implemented detecting method of claim 1.

15. A computer-implemented manufacturing system capable of providing an authenticated semiconductor device, said computer-implemented manufacturing system configured to perform the computer-implemented manufacturing method of claim 14.

16. A semiconductor device designed by performing the computer-implemented detecting method of claim 1.

17. A test platform, comprising:
  a hardware implementation, executing autonomously without a processor, the detecting method of claim 1.

18. An electronics automated design application executable by a processor, said automated design application configured to generate a hardware design to perform the detecting method of claim 1.

19. A non-transitory computer-accessible medium having stored thereon computer-executable instructions for designing a hardware design, wherein, when a hardware implementation of said design arrangement executes autonomously, to perform procedures comprising the detecting method of claim 1.

* * * * *